United States Patent [19]
Izuno et al.

[11] Patent Number: 6,118,889
[45] Date of Patent: Sep. 12, 2000

[54] SIGNATURE INPUT APPARATUS AND A SIGNATURE VERIFICATION SYSTEM

[75] Inventors: Akinobu Izuno, Isehara; Yutaka Abe; Masahiko Ikeda, both of Hiratsuka; Morio Sato, Fujisawa, all of Japan

[73] Assignee: Kabushiki Kaisha Pilot, Tokyo, Japan

[21] Appl. No.: 09/043,545

[22] PCT Filed: Jul. 10, 1997

[86] PCT No.: PCT/JP97/02403

§ 371 Date: Mar. 23, 1998

§ 102(e) Date: Mar. 23, 1998

[87] PCT Pub. No.: WO98/05001

PCT Pub. Date: Feb. 5, 1998

[30] Foreign Application Priority Data

Jul. 26, 1996 [JP] Japan .................................... 8-198012

[51] Int. Cl.⁷ .................................................. G06K 9/20
[52] U.S. Cl. ...................... 382/119; 382/189; 178/18.03; 349/12
[58] Field of Search .................................... 382/115, 116, 382/119–123, 312, 313, 315, 316; 178/19.01–19.07, 18.01, 18.03–18.09; 438/30; 40/448; 434/155; 73/865.4; 348/161; 345/104; 349/12, 32, 40, 86

[56] References Cited

U.S. PATENT DOCUMENTS

| 4,525,032 | 6/1985 | Hilsum ................................ 350/331 R |
| 5,136,404 | 8/1992 | Nobile et al. ............................. 359/52 |
| 5,272,470 | 12/1993 | Zetts ....................................... 345/173 |
| 5,351,143 | 9/1994 | Sato et al. ................................ 359/51 |
| 5,401,916 | 3/1995 | Crooks .................................... 178/18 |
| 5,434,928 | 7/1995 | Wagner et al. ......................... 382/187 |
| 5,568,292 | 10/1996 | Kim ........................................ 359/67 |

FOREIGN PATENT DOCUMENTS

| 0 488 116 A2 | 3/1992 | European Pat. Off. ........ C09K 19/00 |
| 0 494 796 A2 | 7/1992 | European Pat. Off. ........ G07F 19/00 |
| 0 511 824 A2 | 11/1992 | European Pat. Off. ......... G06K 9/22 |
| 56-77884 | 6/1981 | Japan . |
| 60-153537 | 8/1985 | Japan . |
| 64-40590 | 3/1989 | Japan . |
| 64-40591 | 3/1989 | Japan . |
| 4-23082 | 1/1992 | Japan . |
| 6-35593 | 2/1994 | Japan . |
| WO 93/08559 | 4/1993 | WIPO .............................. G09G 3/02 |

OTHER PUBLICATIONS

European Search Report for EP 97 93 0758 dated Aug. 25, 1999.

*Primary Examiner*—Leo H. Boudreau
*Assistant Examiner*—Brian Werner
*Attorney, Agent, or Firm*—Finnegan, Henderson, Farabow, Garrett & Dunner, L.L.P.

[57] ABSTRACT

The object is to improve the accuracy of signature input and signature verification and improve security by causing the handwriting of a signature to disappear by itself. The signature verification system includes a signature input apparatus 1 and a signature verifying apparatus 6. Signature input apparatus 1 has an externally charged type liquid crystal sheet 2 which has an underside being adhesive and is placed on a coordinate input unit 3. When a dedicated pen 5 having the function of applying static charge onto this liquid crystal sheet 2 is used to write a signature, the handwriting of the signature is liquid crystal representation on the display area of liquid crystal sheet 2 and this handwriting of the signature will disappear by itself after a predetermined period of time. Further, signature verifying apparatus 6 reads the handwriting coordinate information of a signature output from coordinate input unit 3 for detecting the handwriting coordinate information of a signature and verifies this handwriting coordinate information with the handwriting coordinate information of signatures which have been registered beforehand.

15 Claims, 16 Drawing Sheets

SIGNATURE INPUT APPARATUS AND A SIGNATURE VERIFICATION SYSTEM

TECHNICAL FIELD

The present invention relates to a signature input apparatus and a signature verification system, and in particular relates to a signature verification system comprising: a signature input apparatus which displays the handwriting of a signature rendered by a coordinate pointer etc. as a liquid crystal representation and has a coordinate input unit for detecting the coordinate information of the handwriting; and a signature verifying apparatus which reads the coordinate information of the handwriting and verifies it with the handwriting coordinate information of signatures which have been registered beforehand.

BACKGROUND ART

FIG. 18 is a block diagram showing a conventional signature verification system. FIG. 19 is a block diagram showing the interior of a signature input apparatus constituting the signature verification system. As understood from FIGS. 18 and 19, the conventional signature verification system includes a signature input apparatus 100 and a signature verifying apparatus 106, and signature input apparatus 100 and signature verifying apparatus 106 are connected through a controller 103.

In signature input apparatus 100, a transparent, active type liquid crystal display unit 101 is mounted on the top of a coordinate input unit 102. This active type liquid crystal display unit 101 incorporates a reduced thickness-type backlight 113 and a backlight power source 114. A signature which has been written on a display area 107 of active type liquid crystal display unit 101 by a particular writer, using a dedicated pen 105 is transferred to a coordinate input area 115 in coordinate input unit 102, where the handwriting of the signature is read out, specifically, the X-coordinate and Y-coordinate and its writing pressure are detected by an X-axis driver circuit 116 and a Y-axis driver circuit 117, a transmission/reception circuit 118 and a CPU 119.

As stated above, the handwriting coordinate information and writing pressure data detected by coordinate input unit 102 are transferred to signature verifying apparatus 106 by way of controller 103, then therein, are used for signature registration and signature verification. At the same time, the data is used for the calculation of the handwriting coordinates in controller 103, the result being sent out to active type liquid crystal display unit 101 as its display data. Based on the transferred display data to liquid crystal display unit 101, the handwriting of the signature is displayed on display area 107 via display controller 111, memory 110, X-axis driver circuit 108 and Y-axis driver circuit 109.

By repeating the above cycle of operations quickly, the handwriting of the signature is displayed as a liquid crystal representation on display area 107 as if it were being written on a paper surface by a writing implement. Here, the active type liquid crystal display is one which displays characters and/or patterns etc., by optically changing, by providing an electric field or the like, the state of arbitrary dots inside the display dots which are arrayed matrix-wise on a plane defined by the X-axis and Y-axis. Signature input apparatus 100 may incorporate a character generator 112 for character fonts for displaying type characters.

On the other hand, sent out from signature verifying apparatus 106 are instructions such as the start of input of a signature (input start of coordinate input unit 102), transfer of the handwriting coordinate data to active type liquid crystal display unit 101, the end of input of a signature, and display deletion of active type liquid crystal display unit 101. Since signature input apparatus 100 incorporates a voice guidance unit 104 composed of an amplifier 121 and a speaker 120 for performing voice guidance, the operation can be guided not only by the liquid crystal display but also by voice guidance.

However, active-type liquid crystal display unit 101 used in a signature input apparatus 100 of the conventional type, has the following problems, as compared to an externally charged type liquid crystal sheet for displaying a signature as a liquid crystal representation by externally applying a static charge.

A) The active type liquid crystal display unit uses a feedback configuration of the coordinate position, needing additional arithmetic operations, so that the response speed to the coordinate input is slower even if the processing capacity is equal.

B) The active type liquid crystal display unit needs active elements for liquid crystal driving, and hence the liquid crystal-display itself needs a complicated structure and costs more.

C) The active type liquid crystal display unit tends to be thick, so it lacks flexibility.

D) The active type liquid crystal display unit uses a dot representation, so the smoothness of the contours of the characters of the signature lowers.

E) When the active type liquid crystal display unit has broken down, it is very difficult to replace its liquid crystal display portion.

F) In the active type liquid crystal display unit, some adjustment is needed so as to avoid the display coordinate positions deviating from the input coordinate positions.

G) In the active type liquid crystal display unit, the user cannot have a normal writing sensation such as when paper and a pencil are used.

H) The active type liquid crystal display unit needs a deleting operation such as data rewrite etc., for canceling the handwriting of a signature after the liquid crystal display of the signature.

The present invention has been devised in order to solve the above conventional problems, and it is therefore an object of the invention to provide a signature input apparatus and a signature verification system including the same, wherein a liquid crystal representation of a signature can be performed by applying static charge, to allow the handwriting coordinate information of the signature to be detected and the characters of the signature to disappear by themselves.

DISCLOSURE OF INVENTION

A signature input apparatus of the invention comprises: a conductive layer; a liquid crystal sheet at least having a liquid crystal dispersed polymer layer in which a liquid crystal is dispersed in a polymer matrix; a coordinate pointer having the function of applying static charge onto the liquid crystal sheet; and a coordinate input unit for detecting the handwriting coordinate information of a signature written using the pointer, wherein the handwriting of the signature written on the liquid crystal sheet disappears by itself. Therefore, there is no concern that the handwriting will be viewed by others, thus improving the security.

Next, a signature verification system of the invention at least comprises:

(A) a signature input apparatus comprising: a conductive layer; a liquid crystal sheet at least having a liquid crystal dispersed polymer layer in which a liquid crystal is dispersed in a polymer matrix; a coordinate pointer having the function of applying static charge onto the liquid crystal sheet; and a coordinate input unit for detecting the handwriting coordinate information of a signature written using the pointer, wherein the handwriting of the signature written on the liquid crystal sheet disappears by itself;

(B) a signature verifying apparatus which reads the handwriting coordinate information of a signature output from the coordinate input unit and verifies this handwriting coordinate information with the handwriting coordinate information of signatures which have been registered beforehand. Since this configuration, in addition to the above advantage, allows smooth handwriting to be displayed as a liquid crystal representation on the liquid crystal sheet screen, it is possible to easily write a signature and hence increase the precision, thus improving the accuracy of signature registration and signature verification.

BEST MODE FOR CARRYING OUT THE INVENTION

Figure 1:
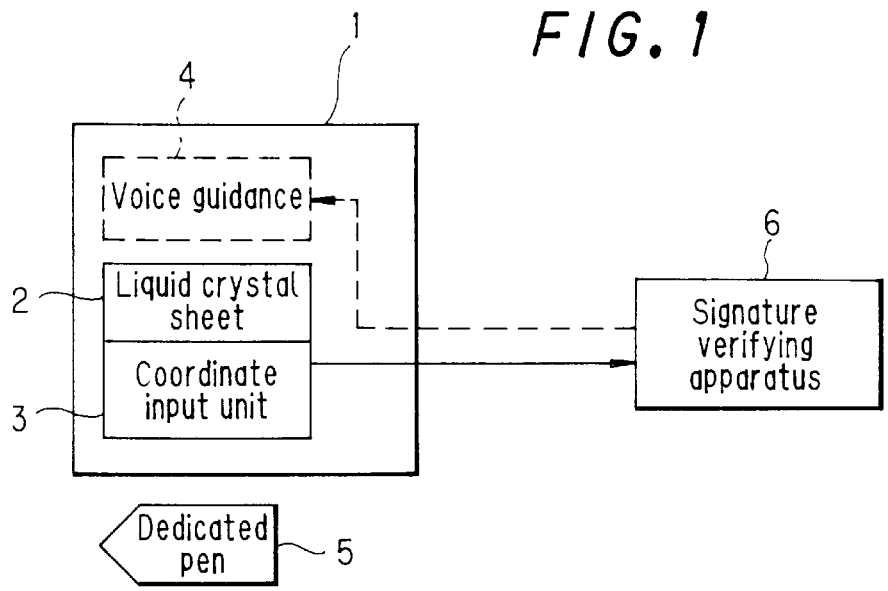
FIG. 1 is a block diagram showing the first embodiment of a signature verification system in accordance with the invention.

The liquid crystal sheet used in the present invention is composed of, mainly, a conductive layer, a liquid crystal dispersed polymer layer in which a liquid crystal is dispersed in a polymer matrix; and a transparent, surface protecting layer, all being laminated successively in this order.

The signature input apparatus in accordance with the invention has a configuration in which the liquid crystal sheet can be removably attached to the surface of the coordinate input unit. This configuration allows the liquid crystal sheet of the invention to be removably attached to a multi-purpose coordinate input unit. More specifically, the member constituting the side opposite the display screen of the liquid crystal sheet is preferably made up of an suction or adhesive material which allows itself to repeatedly be attracted to or be adhered to the surface of the coordinate input unit.

This conductive layer of the liquid crystal sheet may be of a transparent or opaque layer as long as it has a surface resistance of $10^7$ Ω/cm or less. In practice, the conductive layer is composed of a base with its surface covered, so as to be conductive, with aluminum, titanium, chromium, tin, rhodium, gold, stainless steel, titanium nitride, nickel-chromium, aluminum-chromium, or tin indium oxide. The base mentioned here is one which supports the conductive layer, and examples include paper, cloth, felt, or plastic film such as polyethylene terephthalate, polyethylene naphthalate, polypropylene, polyethylene, polyvinyl chloride, polysulfone, polyphenylene oxide, ionomer, polyimide, polycarbonate etc. Here, if the conductive layer itself is of a metal film, no base is needed.

The liquid crystal dispersed polymer layer of this liquid crystal sheet is one in which a liquid crystal is dispersed in a polymer matrix. The techniques for dispersing a liquid crystal in a polymer matrix include: a polymer-liquid crystal common solvent evaporation phase-separating process (common solvent casting process); a polymerization phase-separating process by which the polymer precursor in a liquid crystal-polymer precursor mixture is caused by light or heat to polymerize; a fusing and cooling phase-separating process by which the liquid crystal and the polymer are cooled from the hot melted state; and a process of dispersing the liquid crystal in a polymer matrix by emulsifying and dispersing the liquid crystal into an aqueous resin and applying and drying it; and the like. These techniques can be used as appropriate.

As for the polymer usable for this liquid crystal dispersed polymer layer, a polymer which is hard to be mutually soluble with the liquid crystal may be used. Specific examples include vinyl resin such as chlorinated polyethylene, polypropylene, polystyrene, acrylic resin etc., vinylidene chloride resin, polyvinyl acetal resin, cellulose resin, ionomer, polyamide, polycarbonate, polyphenylene oxide, polysulfone, fluororesin, silicone resin, styrene-butadiene rubber, chlorosulfonic polyethylene, polyester, epoxy resin etc. Here, polyvinyl acetal resin includes polyvinyl formal, polyvinyl acetoacetal, polyvinyl butyral, etc.

As for the polymer constituting the liquid crystal dispersed polymer layer, a polymer having a crosslinked structure (to be referred to as cross-linking polymer) is preferred. With a cross-linking polymer, the cross-linking polymer and the liquid crystal will never become mutually solved when the liquid crystal sheet of the invention is exposed to a high temperature state, so that it is possible to maintain a stable liquid crystal micro-dispersed structure. Accordingly, it is possible to produce a liquid crystal sheet having durability, without any degradation of performance with the passage of time.

Examples of the cross-linking polymer include: a cross-linking polymer obtained by mixing polymers having a functional group such as double bond, hydroxyl, carboxyl, epoxy, isocyanate, amino etc., with a cross-linking agent which is reactive with the functional group; and a cross-linking polymer which is obtained by mixing a reactive polymer with a polymer having a functional group of the above ones and causing reactions.

Examples of the cross-linking agent used in the above reaction, includes: di-isocyanate compounds, organic peroxides, amine compounds, epoxy compounds, dicarboxylic acid or carboxylic acid anhydride, formaldehyde, dialdehyde, diol, bisphenol, silanol compounds, metal oxides, metal halides, photo-cross-linking agent (photopolymerization initiator), etc. Examples of reactive polymers include phenol resin, amino resin, polyisocyanate, polyol, epoxy resin etc.

Preferable cross-linking polymers are ones which is obtained by reacting di- or polyisocyanate with a polymer such as polyvinyl acetal resin, epoxy resin, acrylic resin, polyester resin etc. More preferable cross-linking polymers are ones which is obtained by reacting di- or polyisocyanate with polyvinyl acetal resin. Here, examples of polyvinyl acetal resin include polyvinyl formal, polyvinyl acetoacetal, polyvinyl butyral etc.

As for the liquid crystal used for the liquid crystal dispersed polymer layer, it is preferred to use a nematic liquid crystal having a positive anisotropic dielectric constant, being in its liquid crystal phase in the temperature range from $-10°$ C. to $100°$ C., from the technical stand point, and having a differential index of birefringence ($\Delta n$) of 0.2 or more in order to produce a clear display of a recorded image.

The volume resistivity of the liquid crystal dispersed polymer layer of the liquid crystal sheet, from the standpoint of the self-disappearing performance of the handwriting of a signature written on the liquid crystal sheet, is preferably equal to or greater than $10^{13}$ $\Omega$.cm and lower than $10^{16}$ $\Omega$.cm at a temperature of $20°$ C. at a relative humidity of 90%. With these settings, when the coordinate pointer is used to apply static charge to the liquid crystal sheet, the liquid crystal inside the liquid crystal dispersed polymer layer, at which writing is being written, is aligned by the electric field, so that the handwriting can be recognized. At the same time, the static charge applied to the handwriting portion moves at the top and bottom of the liquid crystal dispersed polymer layer with the passage of time and is neutralized, so that the handwriting will disappear by itself after a predetermined period of time. Accordingly, the problem of security can be eliminated.

In the signature input apparatus and signature verification system of the invention, when the liquid crystal sheet is composed mainly of a conductive layer, a liquid crystal dispersed polymer layer in which a liquid crystal is dispersed in a polymer matrix, and a transparent, surface protecting layer, all being laminated successively in this order, the liquid crystal dispersed polymer layer needs to have a volume resistivity of $10^{13}$ $\Omega$.cm or higher and lower than $10^{16}$ $\Omega$.cm at a temperature of $20°$ C. at a relative humidity of 90%, and the surface protecting layer needs to have a volume resistivity of $10^{9}$ $\Omega$.cm or higher and lower than $10^{16}$ $\Omega$.cm at a temperature of $20°$ C. at a relative humidity of 90%. Specific examples of the transparent, surface protecting layer of the liquid crystal sheet include: vinyl resin such as chlorinated polyethylene, polypropylene, polystyrene, acrylic resin etc., vinylidene chloride resin, polyvinyl acetal resin, cellulose resin, ionomer, polyamide, polycarbonate, polyphenylene oxide, polysulfone, fluororesin, silicone resin, styrene-butadiene rubber, chlorosulfonic polyethylene, polyester, epoxy resin, and mixtures of these, etc. The surface protecting layer may be obtained by laminating a film made up of the above material, using a sticky material or adhesive, by applying or spraying the material and drying it, or by applying a reactive material solution and causing the reaction after application. The surface protecting layer may be added with additives such as a surfactant, conductive micro-particles, UV absorbent, light stabilizer, etc.

Examples of the coordinate input unit used in the signature input apparatus of the invention, include: one which detects the X-axis and Y-axis coordinate data of the handwriting of a signature which is written by a coordinate pointer having the function of applying static charge to, or erasing static charge from, the liquid crystal sheet within the coordinate input area; or one which not only detects the coordinate data of the handwriting, but also detects writing pressure, and further detects, the X-axis and Y-axis coordinate data when the coordinate point is floating within a certain height in the coordinate input area. Specific examples of the coordinate input unit include: an electromagnetic induction type, pressure-sensitive resistance type, pressure-sensitive contact type, magnetostrictive type, capacitance coupling type, magnetic coupling type, etc.

In the signature verifying apparatus used in the signature verification system of the invention, the X-axis and Y-axis coordinate data (including that when the pen was floating) and the writing pressure data detected by the coordinate input unit during the input of a signature by a dedicated coordinate pointer, are transferred to be used for signature registration and signature verification. Further, the signature verifying apparatus is able to instruct the start of input of a signature, the end of input of a signature, and re-input etc., as well as presenting the verification result etc., through voice guidance. It is also possible for the signature verifying apparatus to have the function of inputting an ID card or ID number in addition to the signature verification.

The signature verification system of the invention may be configured as an independent system which, for example, controls admittance to a room by verifying the signature. In this case, the signature verifying apparatus uses a computer which has verification software and memories for registration data installed therein. The signature verification system of the invention, can be connected to a variety of networks via a dedicated or multi-purpose communications line. In this case, communication software is also installed to the above-exemplified computer. However, if the verification software and/or the memories for registration data are built in any other unit or a dedicated unit, this computer does not need to have the above software and/or memory. The signature verification system of the invention, can be constructed so that it can be used both ways, as the above independent system and as the configuration which is connected to various networks.

Next, the embodied modes of the signature input apparatus and signature verification system in accordance with the invention will be described in detail with reference to the drawings.

The First Embodiment

Figure 2:
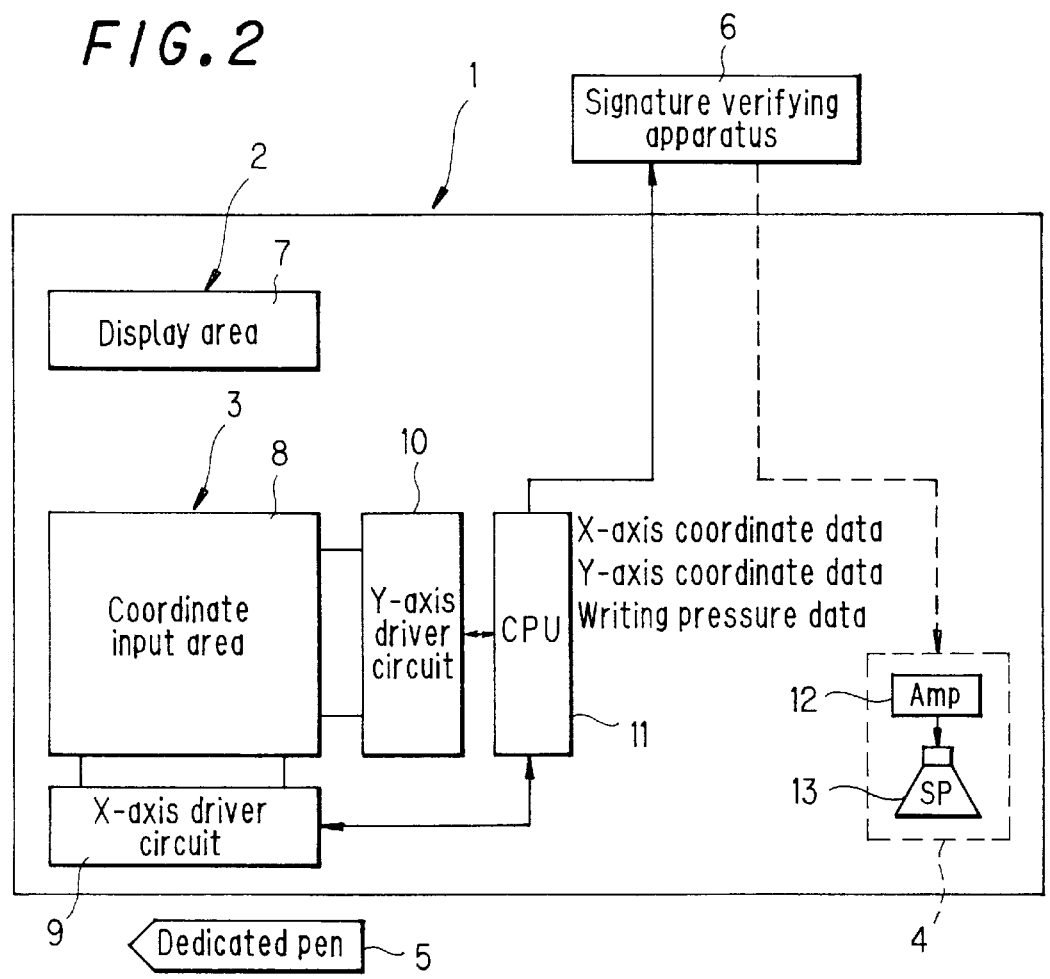
FIG. 2 is a block diagram showing the interior of the signature input apparatus shown in FIG. 1.
Figure 3:
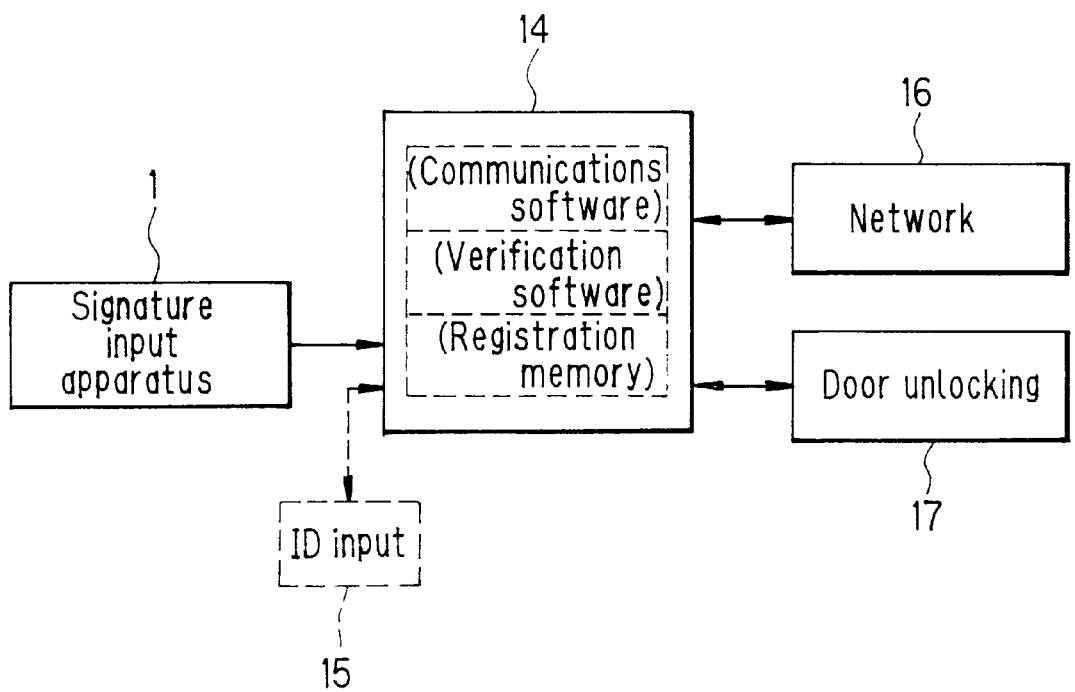
FIG. 3 is a block diagram showing an embodiment of the signature verification system shown in FIG. 1.

FIG. 1 is a block diagram showing the first embodiment of a signature verification system in accordance with the invention. FIG. 2 is a block diagram showing the interior of the signature input apparatus shown in FIG. 1. FIG. 3 is a block diagram showing an embodiment of the signature verification system shown in FIG. 1.

As shown in FIGS. 1 and 2, signature input apparatus 1 includes a coordinate input unit 3 and an externally charged type liquid crystal sheet 2 placed thereon with its underside being adhesive. A signature verifying apparatus 6 is directly connected to coordinate input unit 3 of signature input apparatus 1, while liquid crystal sheet 2 is separated independently. Signature input apparatus 1 also has a voice guidance unit 4 for instructing the start of input of a signature, the end of input of the signature and re-input etc., which are all sent from signature verifying apparatus 6 and presenting the verification result etc., through voice guidance. Voice guidance unit 4 is composed of an amplifier 12 and speaker 13.

Coordinate input unit 3 in FIG. 2 is of a pressure-sensitive resistance type, in which a dedicated coordinate pointer (to be referred to hereinbelow as a dedicated pen and its inner structure will be described later) 5 having the function of applying static charge onto liquid crystal sheet 2 within a coordinate input area 8 of this coordinate input unit 3 is used to write a signature, from which handwriting will be detected on the X-axis and Y-axis coordinate data and writing pressure data, by an X-axis driver circuit 9, Y-axis driver circuit 10 and CPU 11. The X-axis and Y-axis coordinate data and writing pressure data of the handwriting of the signature thus detected by coordinate input unit 3 are transferred to signature verifying apparatus 6, where they are used for signature registration and signature verification.

On the other hand, instructions of the start of input of a signature, the end of input of the signature, and re-input etc. as well as the verification result etc. are informed of from signature verifying apparatus 6 by voice guidance unit 4. The handwriting of a signature written by dedicated pen 5 onto a display area 7 of liquid crystal sheet 2 is displayed as a liquid crystal representation, simultaneously with the input of the signature, and this handwriting of the signature will disappear by itself after a certain period of time. This configuration provides for improvement of security, without allowing a third person to view the handwriting of the signature. Further, liquid crystal sheet 2 is able to perform liquid crystal display of a varying width of handwriting, by making use of the tip of dedicated pen 5 elastically deforming in accordance with writing pressure.

Signature verification unit 6 used in this embodiment, as shown in FIG. 3, is a computer 14 having communications software, verification software, and memories for registration, installed therein. This computer 14 is configured so as to implement ID input 15 of ID cards, ID numbers etc. in addition to signature verification. Further, computer 14 is connected to a variety of networks 16 via communications lines, either, dedicated ones or multipurpose ones. Further, based on the result of the signature verification, a door unlocking operation 17 can be performed. A switching mechanism (not shown) is provided for computer 14, which determines whether the signature verification system of this embodiment is used as an isolated system for performing only door unlocking operation 17, or is only used for connection to network 16, or is used for both.

Figure 4:
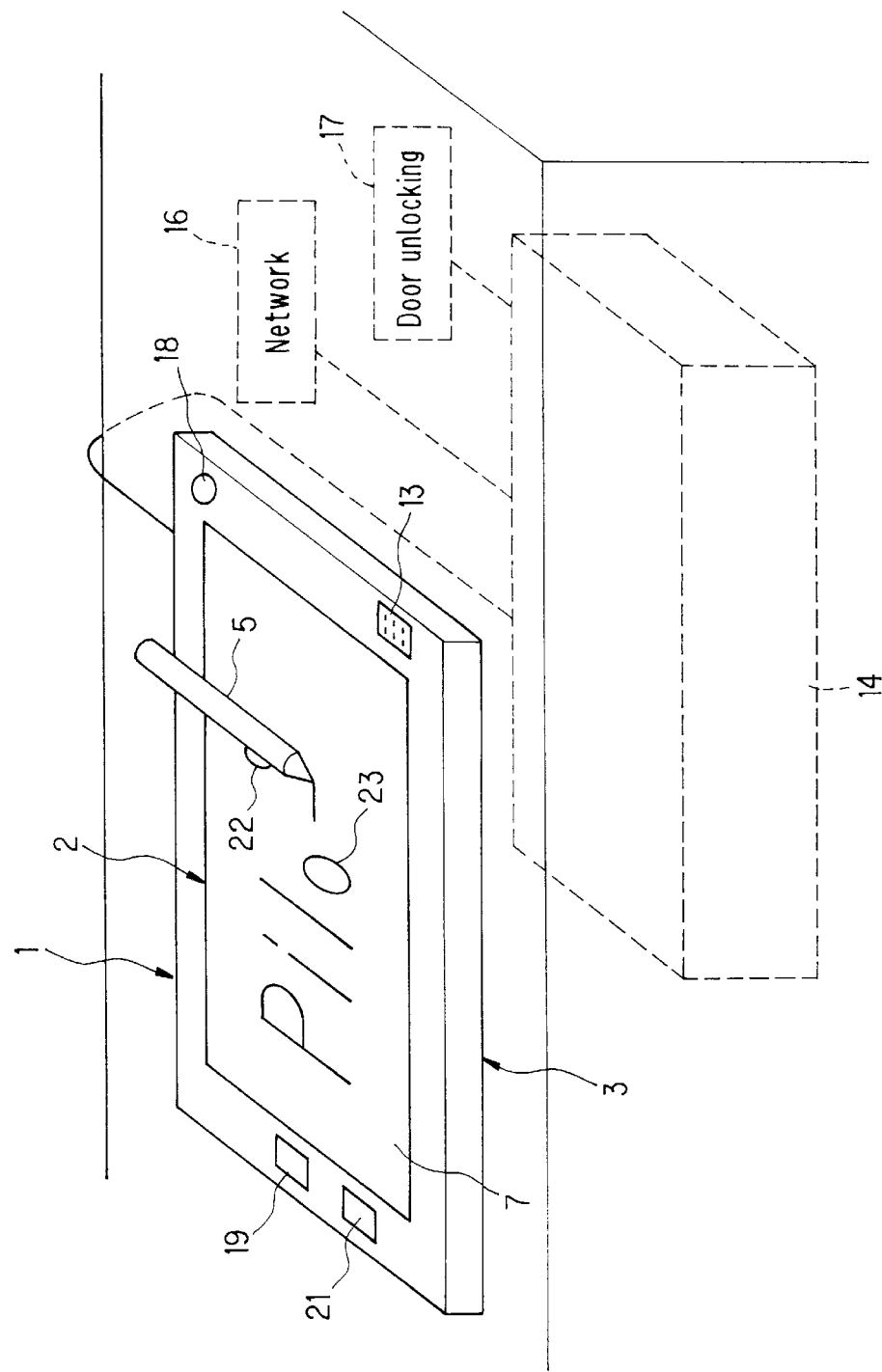
FIG. 4 is a schematic external perspective view showing the first embodiment of a signature verification system in accordance with the invention.
Figure 5:
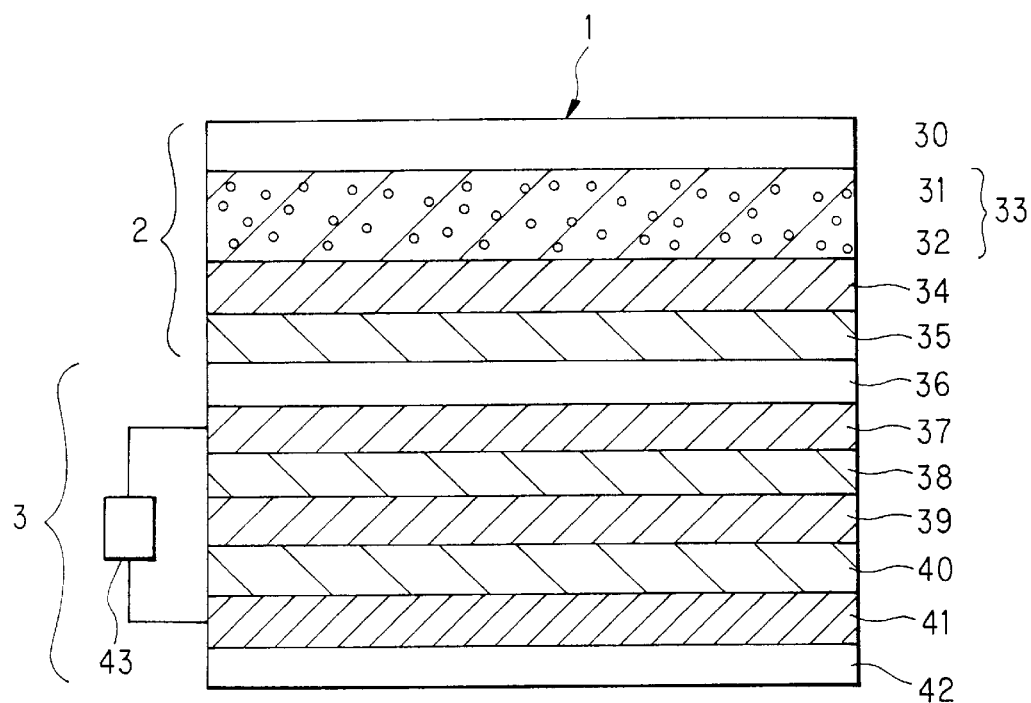
FIG. 5 is a schematic vertical sectional view showing the signature input apparatus shown in FIG. 1.

FIG. 4 is a schematic external perspective view showing the first embodiment of a signature verification system in accordance with the invention. FIG. 5 is a schematic vertical sectional view showing the signature input apparatus used in the first embodiment. Signature input apparatus 1, as apparent from FIG. 5, is composed of a liquid crystal sheet 2 and a coordinate input unit 3. Liquid crystal sheet 2 is applied to coordinate input unit 3 with a sticky material so that liquid crystal sheet 2 can repeatedly adhere thereto and separate there from. Liquid crystal sheet 2 is fabricated as follows: Aluminum is evaporated on a base 35 made up of polyethylene terephthalate film. This aluminum film 34 forms a conductive layer 34. Formed on conductive layer 34 is a liquid crystal dispersed polymer layer 33 in which liquid crystal droplet 31 are dispersed in a polymer matrix 32. Finally, a transparent, surface protecting layer 30 is laminated on liquid crystal dispersed polymer layer 33. In this way, liquid crystal sheet 2 is completed. Here, conductive layer 34 is electrically connected to the conductive material to which an operation start button 21 in FIG. 4 is applied. This operation start button 21 works as a contact electrode.

Coordinate input unit 3 is fabricated from a base 42 also serving as the insulating member, a Y-axis coordinate resistance sheet 41 formed thereon, a pressure-sensitive sheet 40, an electrode sheet 39, a pressure-sensitive sheet 38, an X-axis coordinate resistance sheet 37 and a flexible sheet 36 made up of an insulative material for protection, all being laminated successively in this order. Further, Y-axis coordinate resistance sheet 41 and X-axis coordinate resistance sheet 37 are connected to a detecting circuit 43 for detecting the handwriting coordinate information of a signature written by dedicated pen 5.

Figure 6:
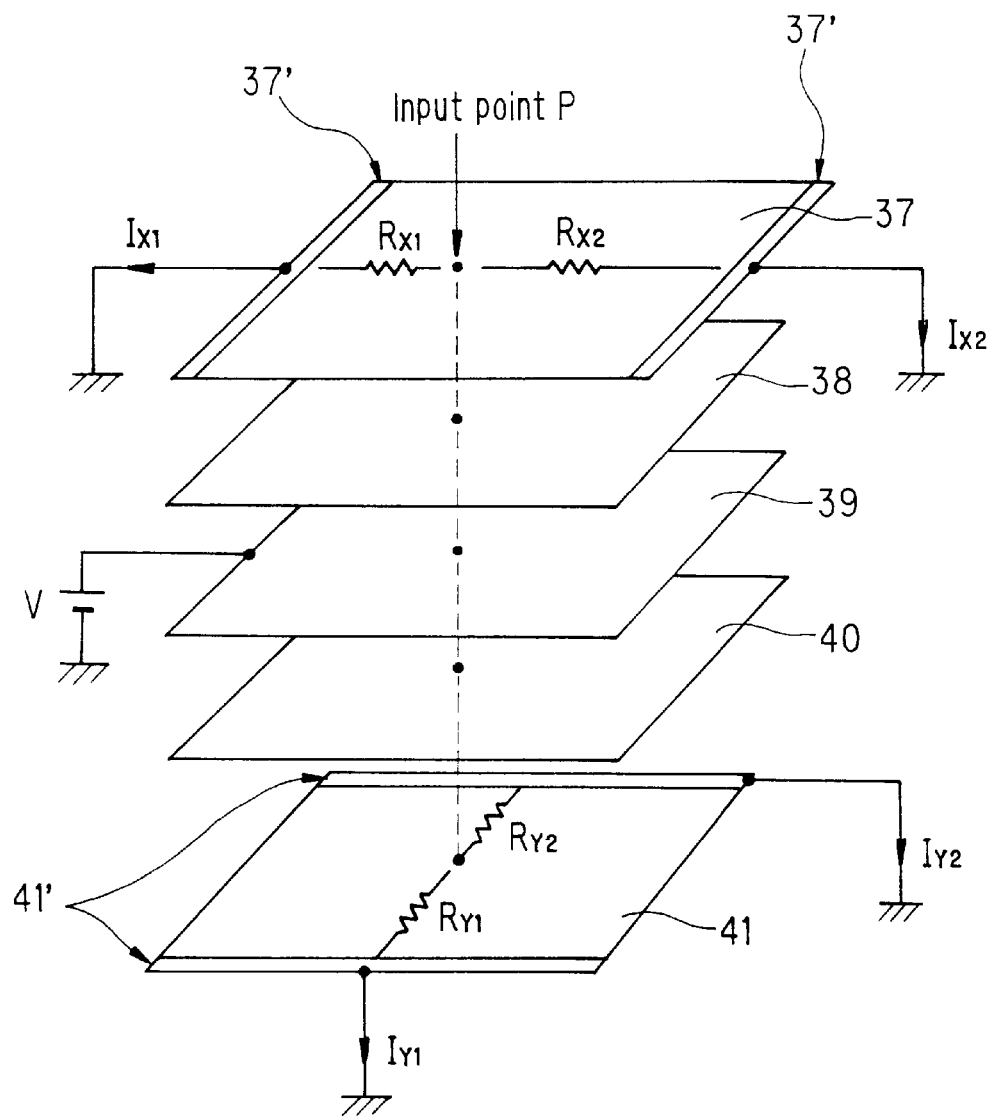
FIG. 6 is a conceptual diagram showing the coordinate detecting portion of the coordinate input unit shown in FIG. 5.

FIG. 6 is a conceptual diagram showing the coordinate detecting portion of a coordinate input unit 3 shown in FIG. 5. A voltage V is applied to electrode sheet 39, which is sandwiched between pressure-sensitive sheets 38 and 40. These sheets have high resistance if they receive no pressure and reduce to a markedly low level, in their resistance, across their thickness if a pressure exceeding a predetermined level is applied. Provided in contact with the opposite sides of sensitive sheet 38 and 40, to electrode sheet 39, are X-axis coordinate resistance sheet 37 and Y-axis coordinate resistance sheet 41, each having uniform resistance. Current extracting electrodes 37' and 41' are provided on both ends of X-axis coordinate resistance sheet 37 and Y-axis resistance sheet 41, respectively. Each of these current extracting electrodes 37' and 41' are connected to detecting circuit 43, so that each current can be measured.

In this arrangement, when a writing pressure exceeding a predetermined level is applied to an arbitrary point P on display area 7 of liquid crystal sheet 2, using dedicated pen 5, the pressure is transferred to each of pressure-sensitive sheets 38 and 40, whereby the resistance values of pressure-sensitive sheets 38 and 40 across their thickness at the point P change to a very low level. As a result, a voltage V is applied to at the point P on both X-axis coordinate resistance sheet 37 and Y-axis coordinate resistance sheet 41 through each of pressure-sensitive sheets 38 and 40. Here, considering the case of X-axis coordinate resistance sheet 37 only, currents $I_{X1}$ and $I_{X2}$ flowing from the point P to current extracting electrodes 37' at respective ends are proportional to the reciprocals of resistance values $R_{X1}$ and $R_{X2}$ from the point P to current extracting electrodes 37' at respective ends. The ratio of $R_{X1}$ and $R_{X2}$ is proportional to the ratio of the distances from the point P in the X-axis direction. Therefore, it is possible to determine the X-coordinate of the point P by measuring the ratio of currents $I_{X1}$ and $I_{X2}$. Similarly, it is possible to determine the Y-coordinate of the point P by measuring the ratio of $I_{Y1}$ and $I_{Y2}$.

Figure 7:
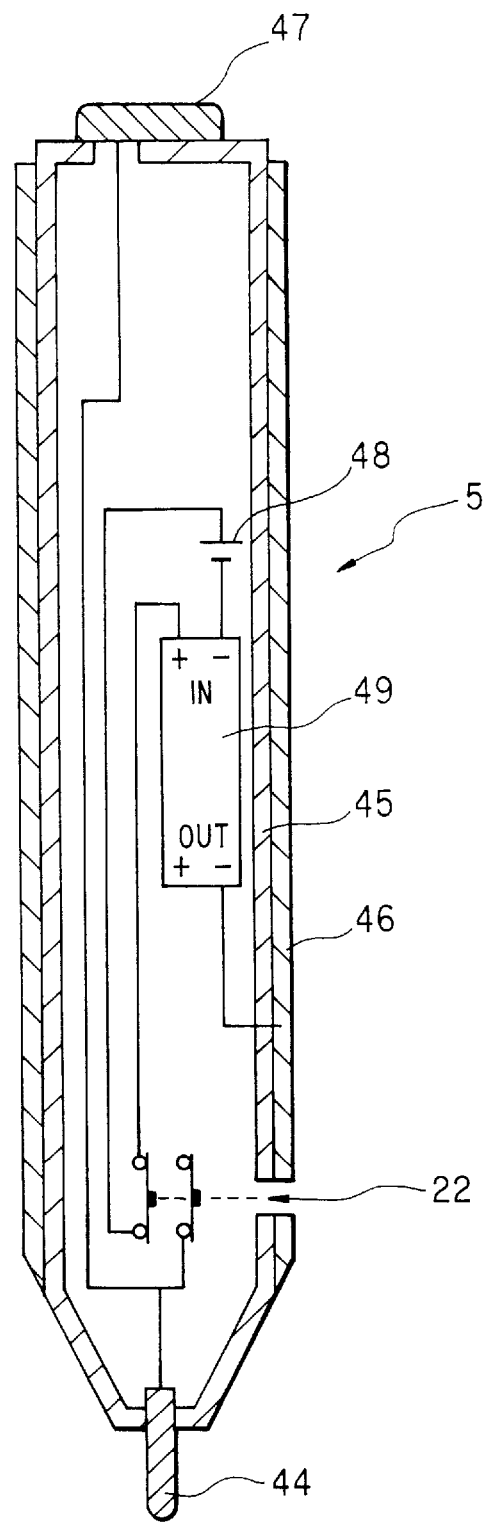
FIG. 7 is a schematic vertical sectional view showing the inner structure of a dedicated pen used in the signature input apparatus of the first embodiment.

Next, description will be made of dedicated pen 5 used in this embodiment. FIG. 7 is a schematic vertical sectional view showing the inner structure of dedicated pen 5 used in signature input apparatus 1 of this embodiment. As shown in FIG. 7, dedicated pen 5 incorporates a writing switch 22, a power source 48 and a voltage generator 49 for applying static charge to liquid crystal sheet 2. Attached at both ends of dedicated pen 5 are a pair of writing elements 44 and 47 for thin lines and for thick lines, which are of a conductive material and transmit the writing pressure to pressure-sensitive sheet 38 and 40 of coordinate input unit 3 so as to point the coordinates of the handwriting of a signature whilst applying static charge to liquid crystal sheet 2. Thus, it is possible to deal with the functions of signature input apparatus 1 (writing with thick lines and writing with thin lines). These, thin-line writing element 44 and thick-line writing element 47, are electrically connected, as shown in FIG. 7, to voltage generator 49 via writing switch 22. A barrel cylinder 45 of dedicated pen 5 is made from an insulative material. An outer sleeve 46 made from a conductive material is provided on the outer peripheral surface of barrel cylinder 45. Here, outer sleeve 46 is electrically connected to the negative output from voltage generator 49.

Now, referring mainly to FIG. 4, description will be made about the operations of the signature verification system comprising signature input apparatus 1 having thus fabricated liquid crystal sheet 2 and coordinate input unit 3, and signature verifying apparatus 6. First, a power switch 18 of signature input apparatus 1 is turned on, and power source 48 of dedicated pen 5 whilst it is gripped by one hand, is turned on by pressing writing switch 22. FIG. 7 mentioned above shows the state in which power source 48 is turned on. As power source 48 is turned on in this way, writing elements 44 and 47 and one of the output terminals for writing from voltage generator 49 are electrically connected.

Next, after writing button 19 is pressed so as to select the writing function of signature input apparatus 1, an operation start button 21 of signature input apparatus 1 is pressed by the finger of the other hand whilst writing switch 22 of dedicated pen 5 is being pressed. Thus, the contact electrode which covers operation start button 21 comes in contact with a part of the person's body, the contact electrode of operation start button 21 and outer sleeve 46 of dedicated pen 5 are electrically connected via the person's body. Further, since conductive layer 34 of liquid crystal sheet 2 is connected to the contact electrode of operation start button 21 as stated above, conductive layer 34 is resultantly connected electrically to outer sleeve 46 of dedicated pen 5. At this time, an applied voltage for writing is output to writing elements 44 and 47 from voltage generator 49.

Then, whilst operation start button 21 is pressed by the finger of the other hand, the signature is made by pressing thin-line writing element 44 or thick-line writing element 47 of dedicated pen 5 onto the display area 7 of liquid crystal sheet 2. At this time, static charge is applied to the written portion on display area 7 of liquid crystal sheet 2, and liquid crystal droplet 31 in liquid crystal dispersed polymer layer 33 are aligned by the electrostatic field. Consequently, handwriting 23 of the signature appears as a liquid crystal representation, on display area 7 of liquid crystal sheet 2. At the same time, the handwriting coordinate information and writing pressure data of the signature written by dedicated pen 5 are detected by coordinate input unit 3 of a pressure-sensitive resistance type.

The handwriting of a signature written on display area 7 of liquid crystal sheet 2 by the above method, disappears by itself after a predetermined period of time because, after the liquid crystal display, the static charge applied to the handwriting portion moves at the top and bottom of liquid crystal dispersed polymer layer 33 and surface protecting layer 30 in liquid crystal sheet 2 and is neutralized with the passage of time.

Conductive writing elements 44 and 47 of dedicated pen 5 may be formed of an elastic material which is deformable by external force. This configuration enables writing elements 44 and 47 to be in contact with liquid crystal sheet 2 in a varying area in accordance with the writing pressure. That is, with the writing pressure being low, the contact area is smaller, whereas with the writing pressure being high, the contact area is larger. Thus, it is possible to easily change the width of the handwriting of a signature in accordance with the writing pressure.

The handwriting coordinate information and writing pressure data of a signature detected by coordinate input unit 3 are transferred to computer 14 incorporating communications software, verification software and registration memories, where signature registration or signature verification is implemented. Computer 14 is connected to a variety of networks 16 via a dedicated or multi-purpose communication line, and the result of the signature verification is used to implement door unlocking operation 17. As stated above, computer 14 has a switching mechanism which determines whether the signature verification system of this embodiment is used as an isolated system for performing only door unlocking operation 17, or is only used for connection to network 16, or is used for both. Further, computer 14 informs instruction of the start and end of signature input and re-input etc. and verification result by way of speaker 13.

The Second Embodiment

Figure 8:
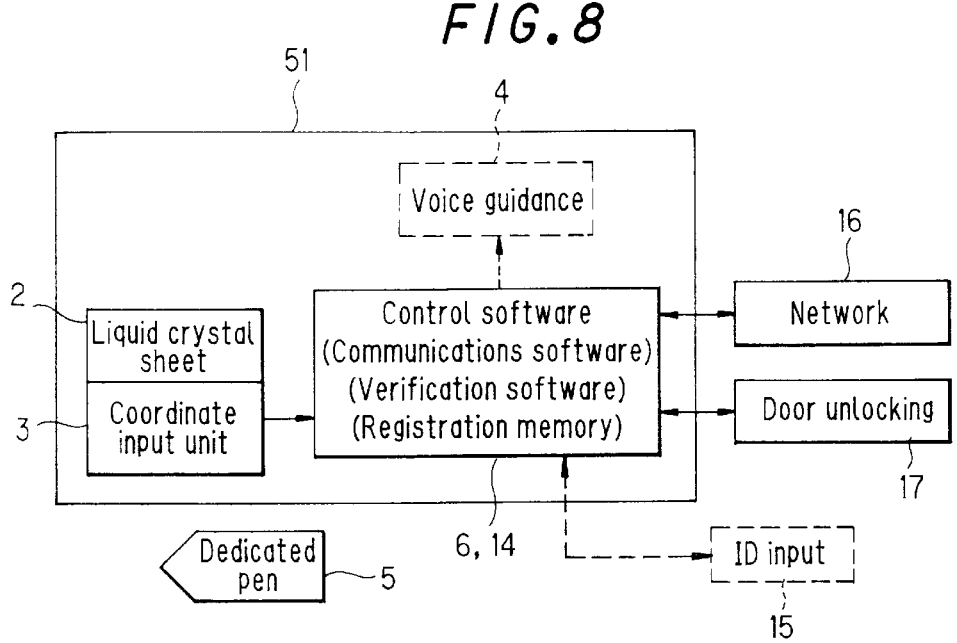
FIG. 8 is a block diagram showing the second embodiment of a signature verification system in accordance with the invention.
Figure 9:
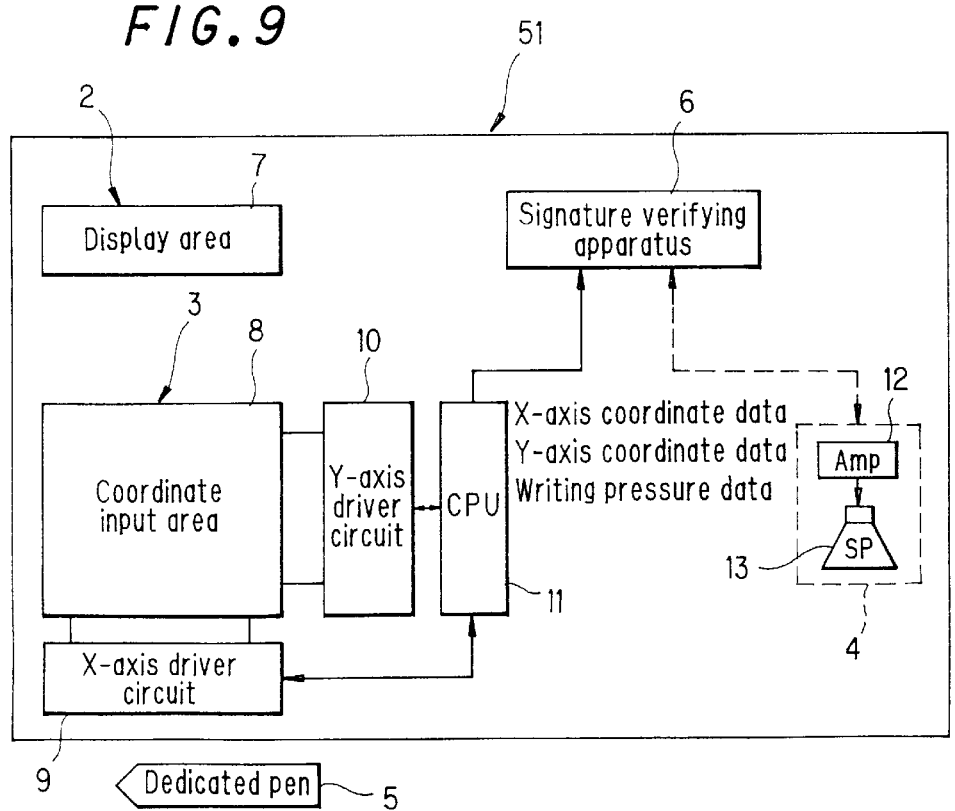
FIG. 9 is a block diagram showing the interior of the signature input apparatus shown in FIG. 8.
Figure 10:
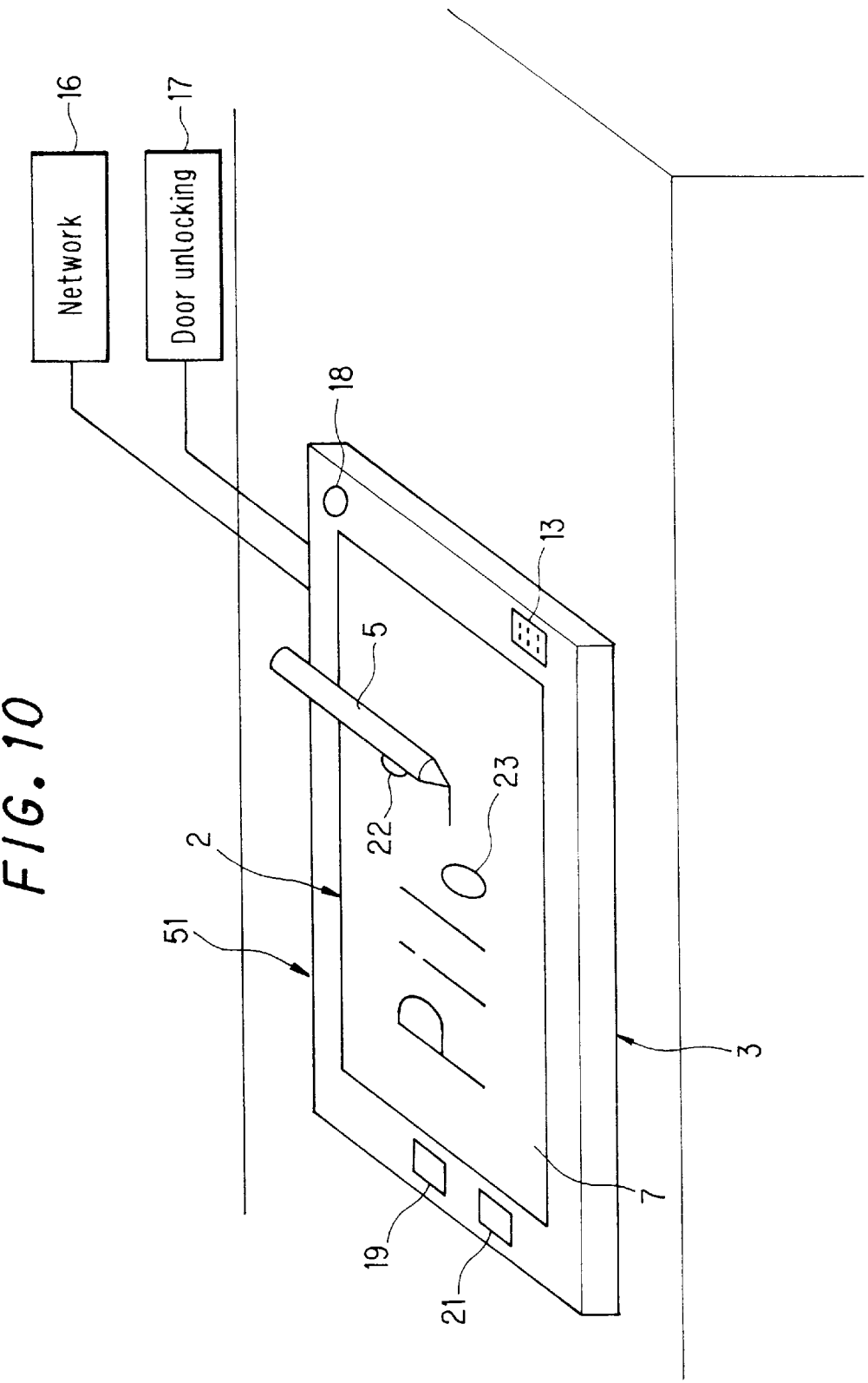
FIG. 10 is a schematic external perspective view showing the second embodiment of a signature verification system in accordance with the invention.

FIG. 8 is a block diagram showing the second embodiment of a signature verification system in accordance with the invention. FIG. 9 is a block diagram showing the interior of the signature input apparatus shown in FIG. 8. FIG. 10 is a schematic external perspective view showing the second embodiment of a signature verification system in accordance with the invention. Here, the same components as in the signature verification system of the above first embodiment are designated with the identical reference numerals used in the first embodiment and the description thereof is omitted.

The difference from the signature verification system of the first embodiment, is that as shown in FIGS. 8 through 10, the signature input portion composed of a liquid crystal sheet 2 and a coordinate input unit 3 and a computer 14 functioning as signature verification apparatus 6 are integrated into a signature input apparatus 51. Other configuration is the same as that of the signature verification system of the first embodiment and the signing operation etc. are also the same.

The Third Embodiment

Figure 11:
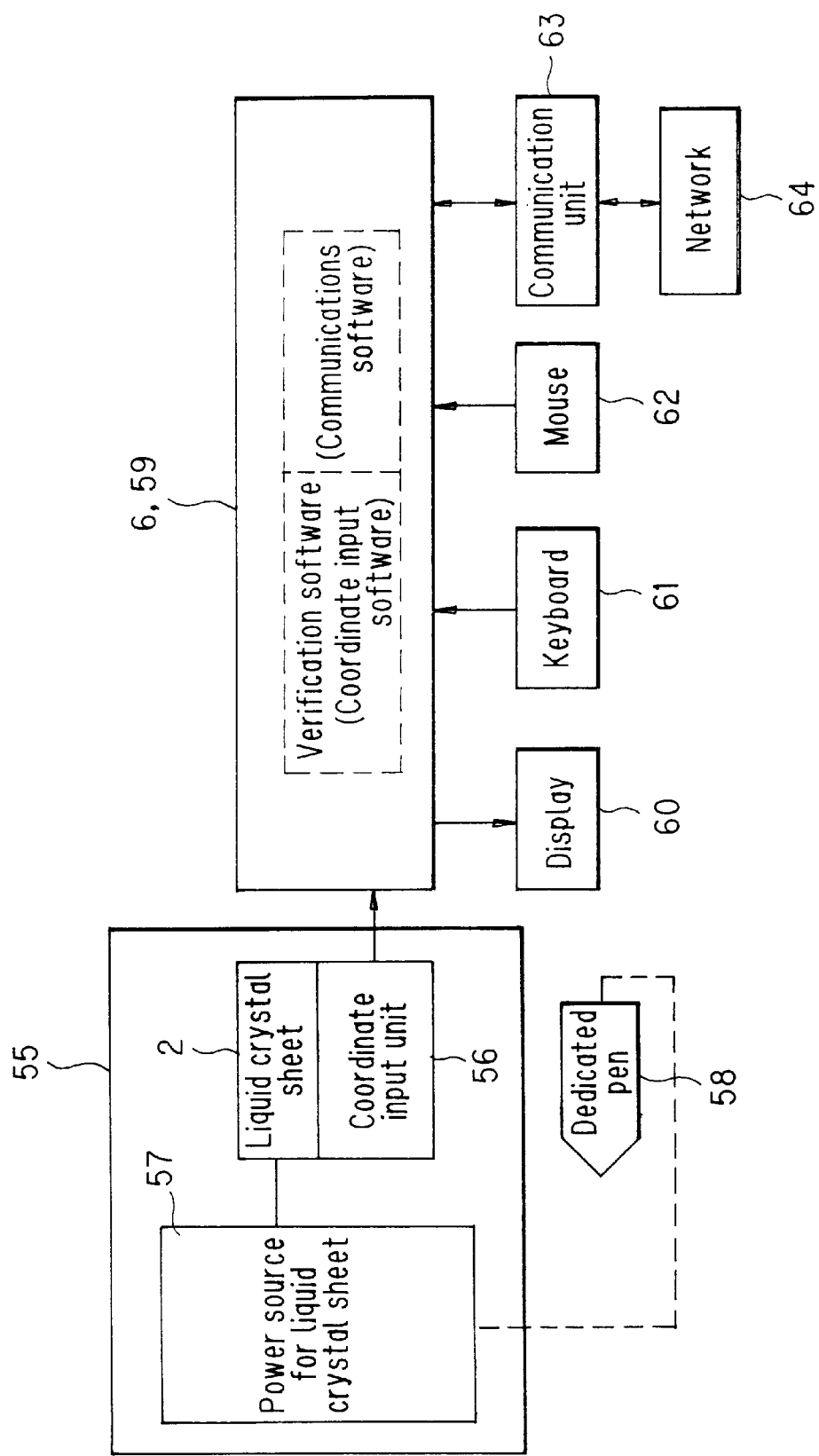
FIG. 11 is a block diagram showing the third embodiment of a signature verification system in accordance with the invention.
Figure 12:
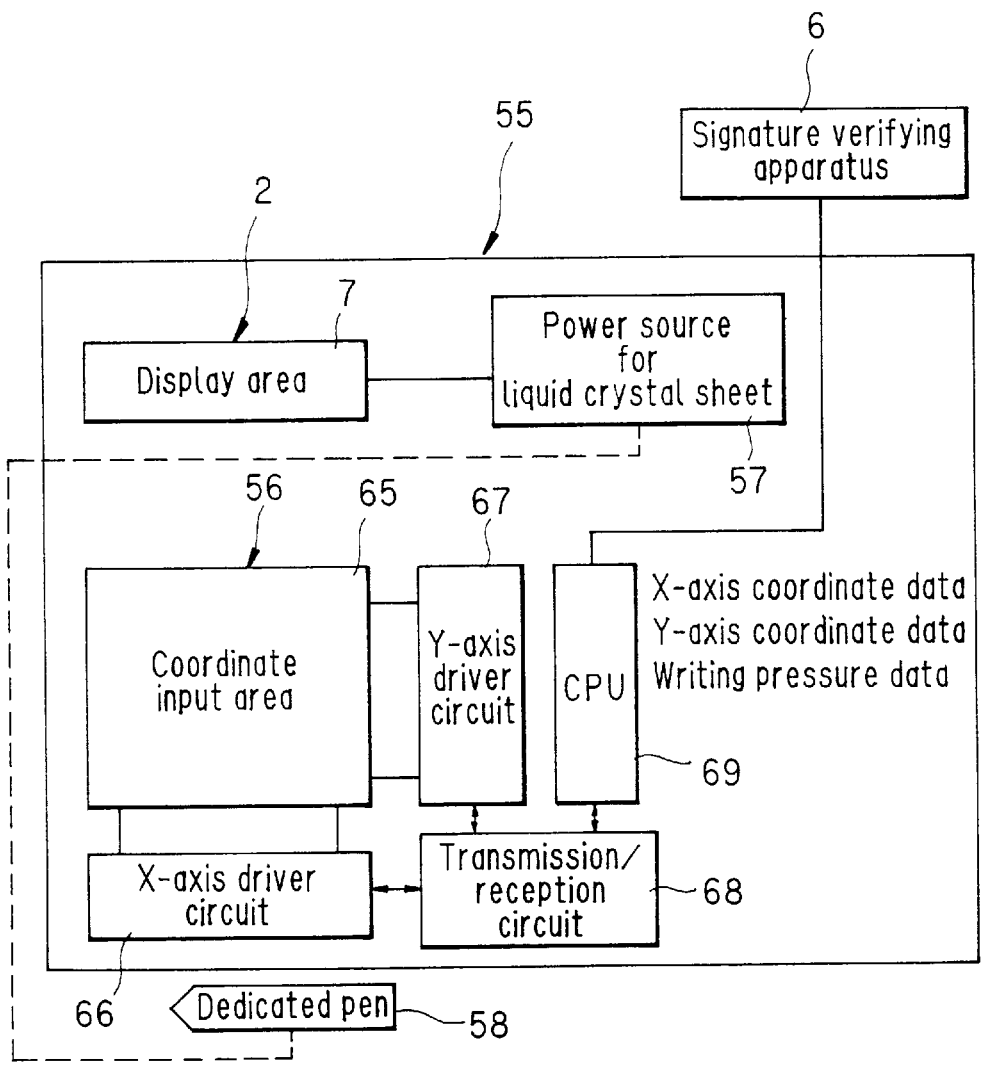
FIG. 12 is a block diagram showing the interior of the signature input apparatus shown in FIG. 11.

FIG. 11 is a block diagram showing the third embodiment of a signature verification system in accordance with the invention. FIG. 12 is a block diagram showing the interior of the signature input apparatus shown in FIG. 11. Here, the same components as in the signature verification systems of the first and second embodiments are designated with the identical reference numerals used in the first and second embodiments and the description thereof is omitted.

As shown in FIGS. 11 and 12, a coordinate input unit 56 of a signature input apparatus 55 used in the signature verification system of this embodiment is of an electromagnetic induction type. Therefore, signature input apparatus 55 incorporates a power source 57 for a liquid crystal sheet as well as using a dedicated pen 58 having the function of applying static charge onto liquid crystal sheet 2 and having a special inner structure (the inner structure will be detailed later). In this coordinate input unit 56 of an electromagnetic induction type, the handwriting of a signature is detected by not only detecting the X-axis and Y-axis coordinate data and writing pressure data from the in-contact written part by dedicated pen 58, onto liquid crystal sheet 2 within a coordinate input area 65 of this coordinate input unit 56, but also by detecting the X-axis and Y-axis coordinate data of the locus of dedicated pen 58 floating away from the liquid crystal sheet, within a certain range of height, over and within coordinate input area 65, by means of an X-axis driver circuit 66, Y-axis driver circuit 67, and transmission/reception circuit 68 and CPU 69 connected thereto.

The X-axis and Y-axis coordinate data (including the floating state) and writing pressure data of the handwriting of the signature thus detected by coordinate input unit 56 are transferred to signature verifying apparatus 6, where they are used for signature registration and signature verification. In this embodiment, as signature verifying apparatus 6, a personal computer (to be referred to as 'PC' hereinbelow) 59 having verification software (coordinate input software) and communications software installed therein. This PC 59 is connected to a display 60, keyboard 61, mouse 62 and communication unit 63. Communication unit 63 is further connected to a variety of networks 64 via a dedicated or multi-purpose communication line.

Figure 13:
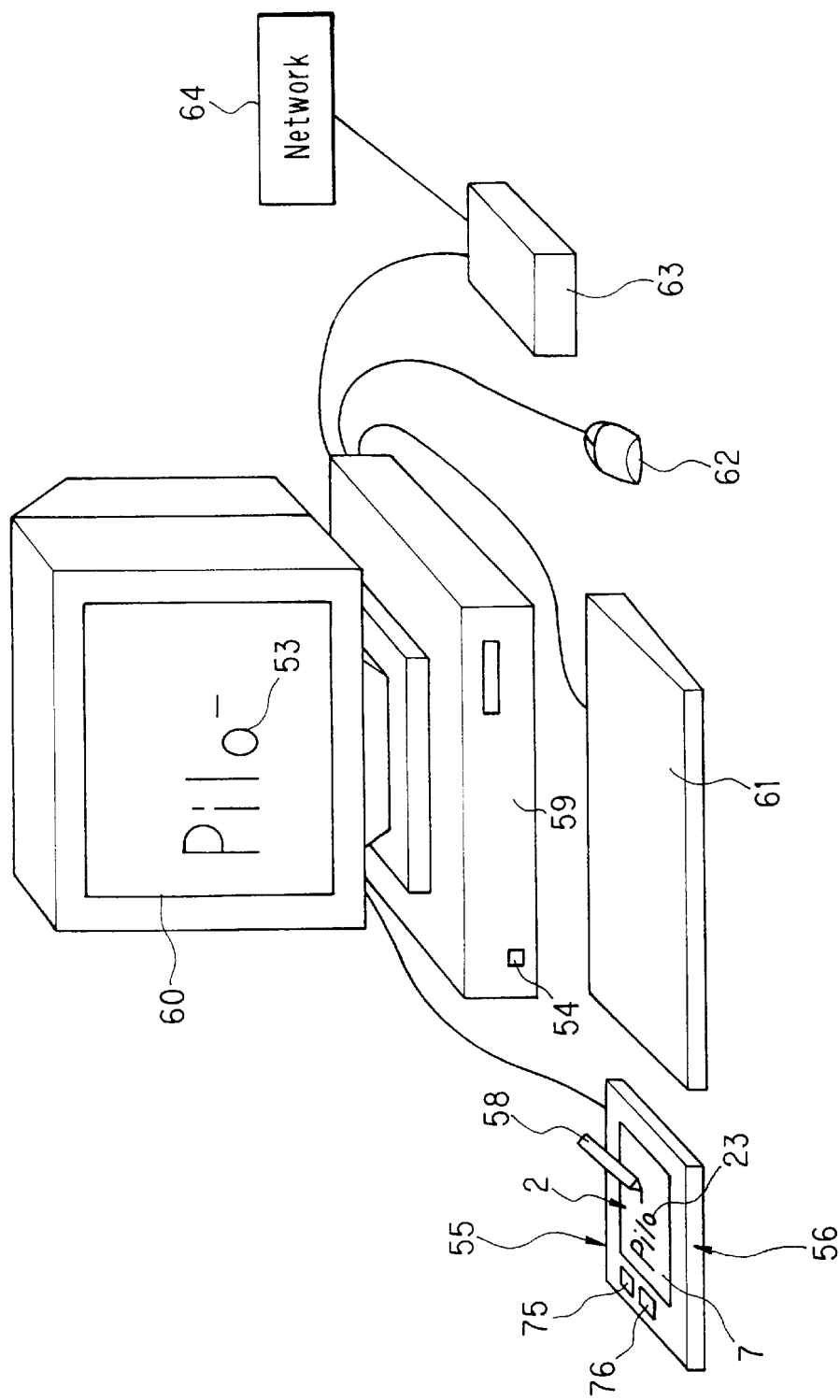
FIG. 13 is a schematic external perspective view showing the third embodiment of a signature verification system in accordance with the invention.
Figure 14:
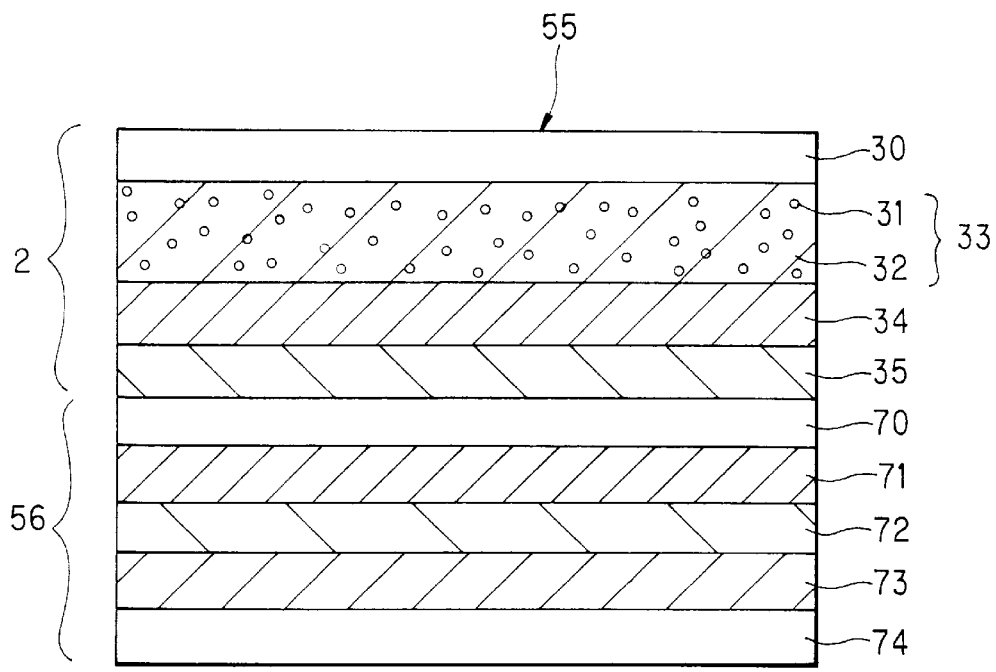
FIG. 14 is a schematic vertical sectional view showing the signature input apparatus shown in FIG. 13.

FIG. 13 is a schematic external perspective view showing the third embodiment of a signature verification system in accordance with the invention. FIG. 14 is a schematic vertical sectional view showing the signature input apparatus used in the third embodiment. Guidance for instruction of the start of input of a signature, the end of input of the signature, and re-input etc. as well as the verification result etc. is displayed on display 60. Handwriting 23 of a signature written by dedicated pen 58 onto a display area 7 of liquid crystal sheet 2 is displayed as a liquid crystal representation, at the same time, its handwriting 53 is displayed on display 60. Handwriting 23 of a signature thus obtained on liquid crystal sheet 2 will disappear by itself after a predetermined period of time. Handwriting 53 of the signature imaged on display 60 is deleted by a command operation from keyboard 61, or by instructing the delete command which is outside the handwriting display area on this display 60, using coordinate input unit 56 or mouse 60 etc. Alternatively, the handwriting on the display may be adapted to be automatically deleted after a lapse of a predetermined period of time, or to be replaced by a display of the verification result of the input signature or by a display of the next operation instructions and the like.

Signature input apparatus 55, as apparent from FIG. 14, is configured such that, liquid crystal sheet 2 is adhered onto coordinate input unit 56 with a sticky material, so as to allow the sheet to be repeatedly adhere thereto and separate therefrom. Coordinate input unit 56 is of an electromagnetic induction type as stated above, and is fabricated by successively laminating a Y-axis directional coil layer 73, an insulating layer 72, an X-axis directional coil layer 71 and a protecting film layer 70, on a base 74, in this order.

Signature input apparatus 55 incorporates power source 57 for a liquid crystal sheet for applying static charge to liquid crystal sheet 2 as stated above and one of the output terminals from power source 57 for a liquid crystal sheet is electrically connected to a conductive layer 34 of liquid crystal sheet 2. Further, the other output terminal from power source 57 for a liquid crystal sheet is electrically connected to a writing contact electrode 76.

Figure 15:
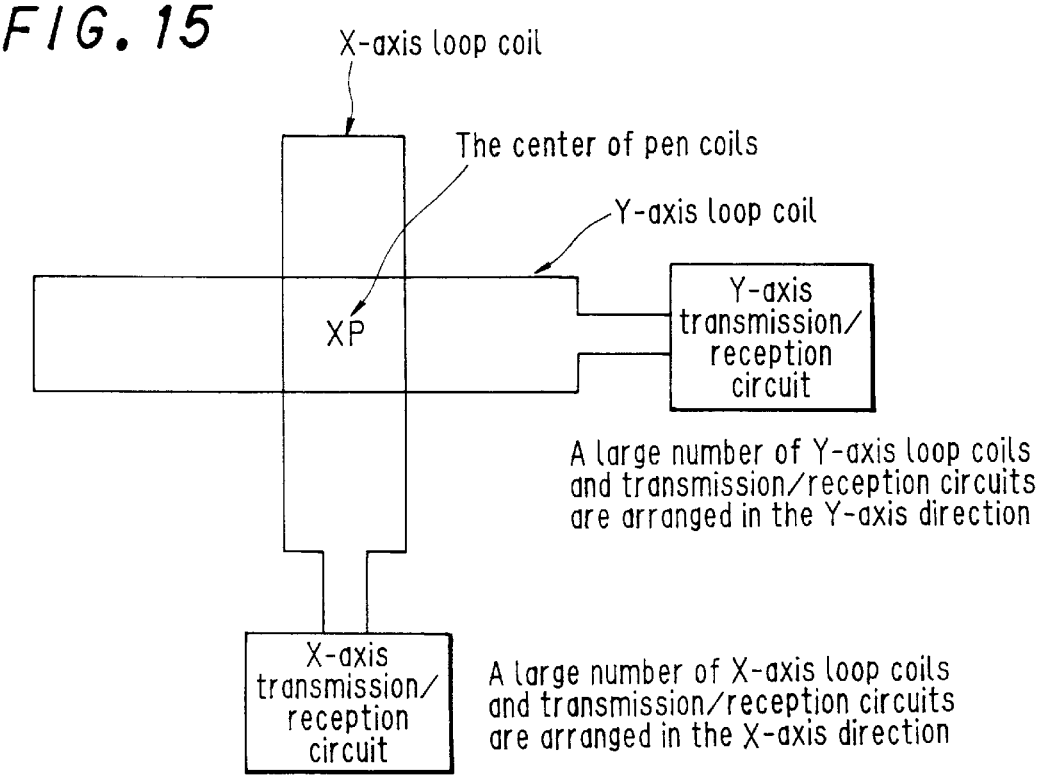
FIG. 15 is a conceptual diagram showing the coordinate detecting portion of the coordinate input unit shown in FIG. 14.

FIG. 15 is a conceptual diagram showing the coordinate detecting portion of the coordinate input unit shown in FIG. 14. In X-axis direction coil layer 71, a large number of X-axis loop coils (not shown) are arranged in the X-axis direction, overlapping one over another at intervals of a certain distance. Similarly, in Y-axis direction coil layer 73, a large number of Y-axis loop coils (not shown) are arranged in the Y-axis direction, overlapping one over another at intervals of a certain distance. All the X-axis loop coils or all the Y-axis loop coils are successively switched to be connected to a transmission/reception circuit for X-axis loop coils or Y-axis loop coils, at intervals of a predetermined time, by a scanning circuit of an electronic switch (not shown). Transmission/reception circuit 68 in FIG. 12 is composed of a transmission circuit for imparting electromagnetic energy in the form of a.c. magnetic flux to dedicated pen 58 and a reception circuit for receiving the response in a form of a.c. magnetic flux of electromagnetic energy accumulated in dedicated pen 58, and performs the transmission and reception alternately. Further, the output from the reception circuit is connected to a calculating circuit (not shown) for calculating the coordinates.

Here, when an operation of a certain X-axis loop coil, which is directly below dedicated pen 58 (the inner structure will be detailed later) placed at an arbitrary point P on liquid crystal sheet 2, is observed, the X-axis loop coil performs a radiation of a.c. magnetic flux for imparting electromagnetic energy to dedicated pen 58. Dedicated pen 58 receives this a.c. magnetic flux, using its coil, and accumulates the electromagnetic energy with an LC resonant circuit in dedicated pen 58. After the a.c. magnetic flux from the X-axis loop coil has been cut off, the electromagnetic energy accumulated in the LC resonant circuit is released through the coil of dedicated pen 58, to perform a radiation of a.c. magnetic flux over a predetermined period of time to coordinate input unit 56. The X-axis loop coil which has finished its radiation and is in the reception state, receives the a.c. magnetic flux from dedicated pen 58, and sends the signal to the calculating circuit (not shown) via the receiving circuit. The calculating circuit makes a comparison between the received signal from the X-axis loop coil and the received signal from X-axis loop coils proximal thereto, thus determining the X-axis coordinate. Similarly, the same operations are performed for the Y-axis loop coils to determine the Y-axis coordinate.

Figure 16:
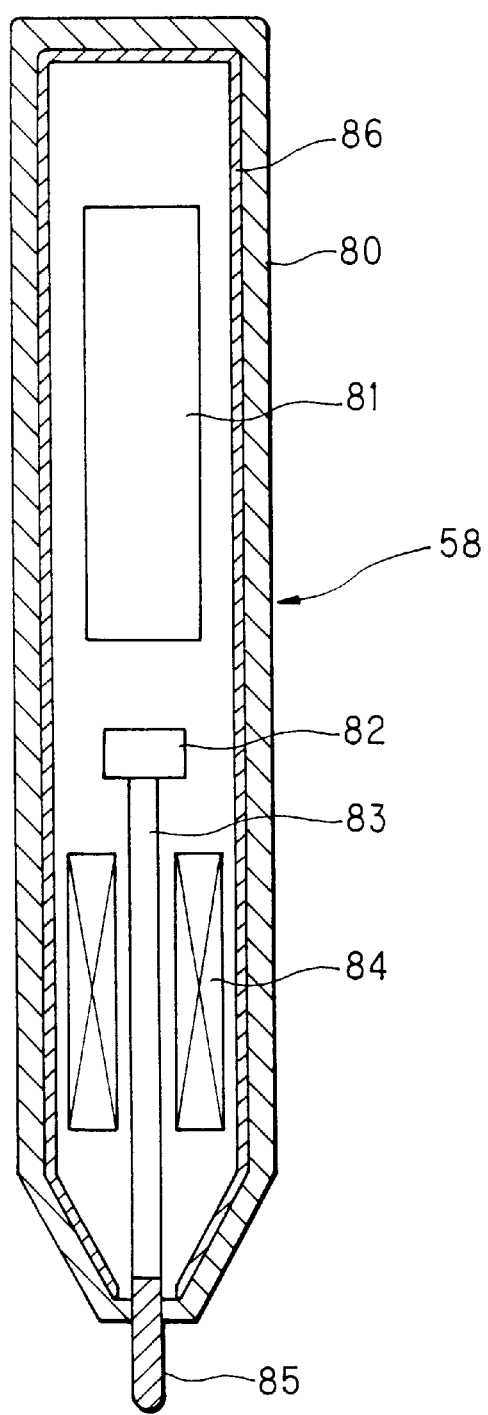
FIG. 16 is a schematic vertical sectional view showing the inner structure of a dedicated pen used in the signature input apparatus of the third embodiment.

Next, description will be made of dedicated pen 58 used in this embodiment. FIG. 16 is a schematic vertical sectional view showing the inner structure of dedicated pen 58 used in signature input apparatus 55 of this embodiment. As shown in FIG. 16, dedicated pen 58 has a inner sleeve 86 consisting of an insulating material and a barrel cylinder 80 consisting of a conductive material which covers this inner sleeve 86. Arranged inside inner sleeve 86 are an LC resonant circuit 81, a writing pressure detector 82, a core member 83 of an insulating material, a writing element 85 of a conductive material, attached at the front end of a coil portion 84 and core member 83. Here, writing element 85 is electrically connected to barrel cylinder 80 but not fixed to barrel cylinder 80. This is because it becomes impossible to detect writing pressure through writing pressure detector 82 if it is fixed. LC resonant circuit 81 and coil portion 84 function as stated above. Barrel cylinder 80 is made up of a conductive material which will not disturb the transmission and reception in the form of a.c. magnetic flux as stated above between each of the loop coils in the coordinate input unit and the coil of the dedicated pen 58. It is also possible to use a barrel cylinder 80 made up of a non-conductive material and provide an opening having a size which will not disturb the propagation of a. c. magnetic flux in the direction toward the tip of the writing element.

Conductive writing element 85 of dedicated pen 58 may be formed of an elastic material which is deformable by external force. This configuration enables writing element 85 to be in contact with liquid crystal sheet 2 in a varying area in accordance with the writing pressure. That is, with the writing pressure being low, the contact area is smaller, whereas with the writing pressure being high, the contact area is larger. Thus, it is possible to easily change the width of the handwriting of a signature in accordance with the writing pressure.

Now, referring mainly to FIG. 13, description will be made about the operations of the signature verification system thus configured. First, a power source switch 75 of liquid crystal sheet power source 57 and a power switch 54 of PC 59 are turned on. Power to signature input apparatus 55 is supplied externally though it is not illustrated. With dedicated pen 58 being gripped by one hand, writing contact electrode 76 is touched by a finger of the other hand. This electrically connects liquid crystal sheet power source 57 with barrel cylinder 80 of dedicated pen 58 through the person's body, and consequently, a voltage to be applied liquid crystal sheet 2 is output at writing element 85 provided at the tip of dedicated pen 58.

When a signature is made by bringing dedicated pen 58 into contact with display area 7 of liquid crystal sheet 2, static charge is applied to the written portion on liquid crystal sheet 2 so that liquid crystal 31 in liquid crystal dispersed polymer layer 33 are aligned by the electrostatic field. Consequently, handwriting 23 of the signature appears as a liquid crystal representation, on display area 7 of liquid crystal sheet 2. At the same time, the handwriting coordinate information (including that from when dedicated pen 58 is floating) and writing pressure data of the signature written by dedicated pen 58 are detected by coordinate input unit 56 of an electromagnetic induction type, based on the aforementioned principle of coordinate detection. Then, the data thus detected in coordinate input unit 56 is sent to PC 59, where it is converted into a coordinate position on display 60 so that handwriting 53 identical with handwriting 23 of the signature appearing on display area 7 is displayed on display 60.

Handwriting 23 of a signature written on display area 7 of liquid crystal sheet 2 by the above method, will disappear by itself after a predetermined period of time because, after the liquid crystal display, the static charge applied to the handwriting portion moves at the top and bottom of liquid crystal dispersed polymer layer 33 and surface protecting layer 30 in liquid crystal sheet 2 and is neutralized with the passage of time.

The handwriting coordinate information and writing pressure data of a signature detected by coordinate input unit 56 are transferred to PC 59 incorporating communications software and verification software, where signature registration or signature verification is implemented. PC 59 is connected to communication device 63, as stated above, and this communication device 63 is further connected to a variety of networks 64 via a dedicated or multi-purpose communication line. In accordance with the result of the signature verification, the PC 59 is connected to communication device 63 and network 64 via a communication line. In this embodiment, the hard disc in PC 59 plays the role of the registration memories, which are incorporated in the computers of the first and second embodiment. PC 59 gives instruction of the start and end of input of a signature, re-input etc. as well as the verification result, by displaying them on display 60. Although control of signature verification is performed by signature input apparatus 55 in accordance with the above description, it is also possible to be controlled through keyboard 61 or mouse 62 which are connected to PC 59.

Figure 17:
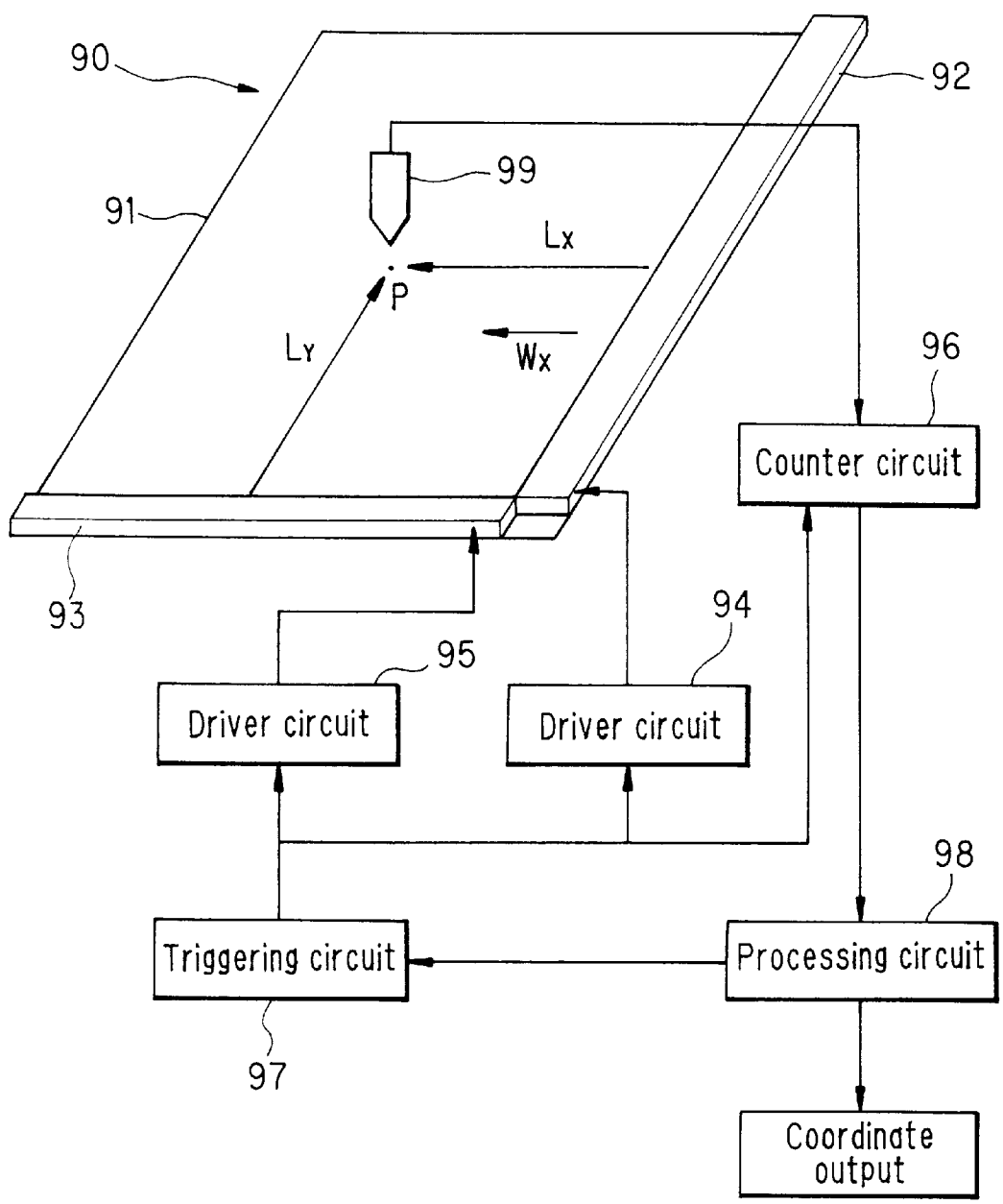
FIG. 17 is a conceptual diagram showing the configuration of a coordinate input unit of a magnetostrictive plate type.
Figure 18:
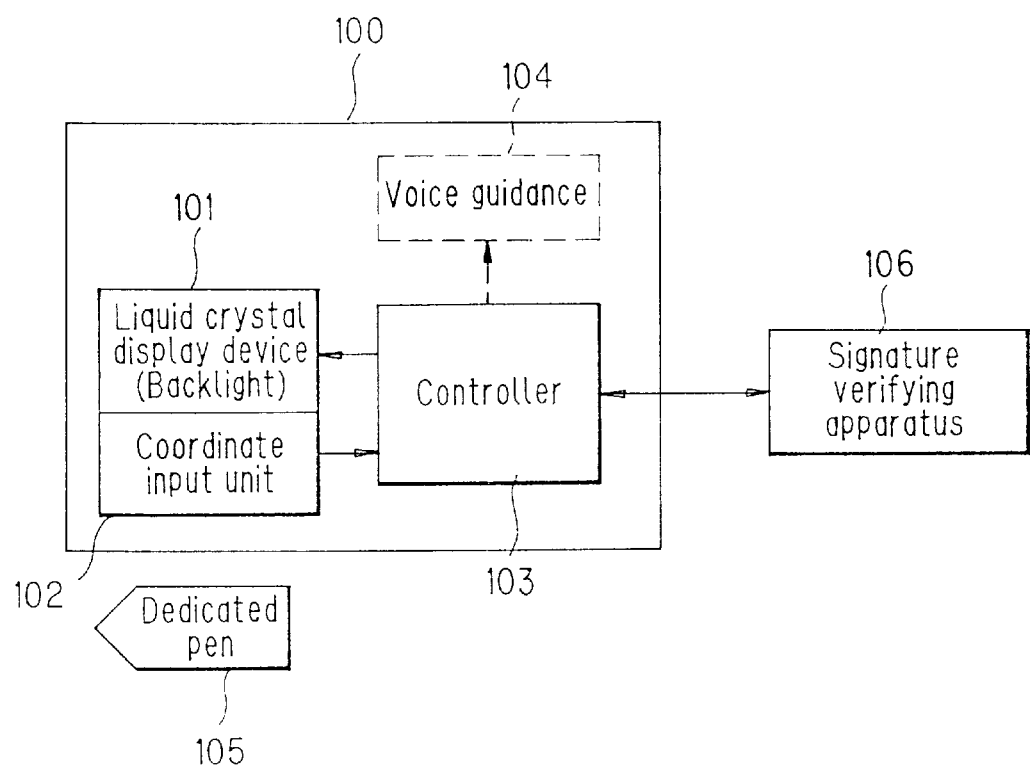
FIG. 18 is a block diagram showing a conventional signature verification system.
Figure 19:
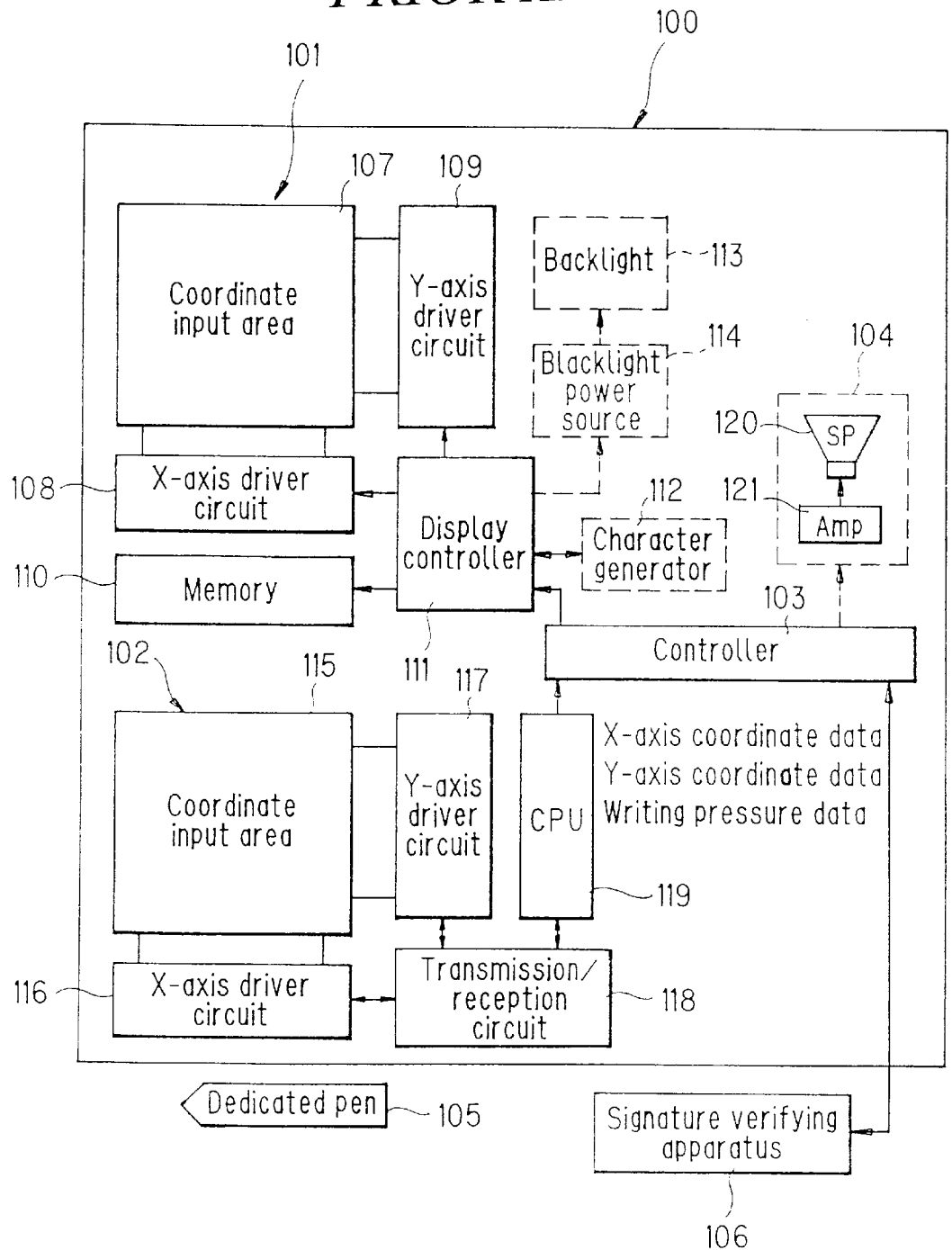
FIG. 19 is a block diagram showing the interior of the signature input apparatus constituting the signature verification system shown in FIG. 18.

In the first and second embodiments, coordinate input unit 3 of a pressure-sensitive resistance type is used whereas coordinate input unit 56 of an electromagnetic induction type is used in the third embodiment. However, these can be replaced as stated above, by a coordinate input unit of a magnetostrictive plate type, for example. FIG. 17 is a conceptual diagram showing the configuration of a coordinate input unit of a magnetostrictive plate type. As shown in FIG. 17, a coordinate input unit 90 of a magnetostrictive plate type comprises: an X-axis oscillation exciting coil 92 and a Y-axis oscillation exciting coil 93 which are wound along counter sides of a magnetostrictive plate 91 for generating magnetostrictive vibrations in the directions of the X-axis and the Y-axis of magnetostrictive plate 91; driver circuits 94 and 95 which are connected to respective oscillation-exciting coils 92 and 93 for driving respective oscillation-exciting coils 92 and 93; a counter circuit 96 for counting time; a triggering circuit 97 for triggering timing of each of circuits 94, 95 and 96; and a calculating circuit 98 for calculating the distance. Designated at 99 is a detecting pen for converting the change in magnetic flux due to magnetostriction vibration into an electrical signal.

Next, the detecting operation of coordinate data by the coordinate input unit of a magnetostrictive plate type will be described. First, when a pulse current is applied to X-axis oscillation exciting coil 92 of magnetostrictive plate 91, the oscillation-exciting magnetic field generates a magnetostriction vibration, so that a magnetostriction wave $W_X$ propagates at a speed V, perpendicularly to X-axis oscillation exciting coil 92, toward the other side of magnetostrictive plate 91. This magnetostriction wave $W_X$ reaches an arbitrary point $P_X$ on magnetostrictive plate 91 where detecting pen 99 is placed, and therein the wave is electrically detected. Here, when the distance from detecting pen 99 to X-axis oscillation exciting coil 92 is L, and the time taken by magnetostriction wave $W_X$ from the time the pulse current is applied to oscillation exciting coil 92 to the time the magnetostriction wave $W_X$ reaches detecting pen 99 is $T_X$, a relation $L_X = V \cdot T_X$ holds. Accordingly, provided that the case where the propagating speed V is always constant, it is possible to calculate the distance $L_X$ by measuring the arrival time $T_X$ so as to determine a coordinate point $P_X$ on the X-axis. A similar operation can be performed for the Y-axis, so that is possible to determine a coordinate point $P_Y$ on the Y-axis. Thus, it is possible to detect coordinate values $P_X$ and $P_Y$ of the position of detecting pen 99, which are placed at an arbitrary point P on magnetostrictive plate 91.

EXAMPLES

Next, the spontaneous disappearance of the handwriting of a signature written on the liquid crystal sheet will be described in detail with reference to examples and comparative examples.

Example 1

Liquid crystal sheet 2 of the invention was fabricated by the following procedures. That is, a deposited aluminum layer of #50 Metalmy (a product of TOYO METALLIZING CO., LTD.: an aluminum deposited film of which base 35 is of a polyethylene terephthalate film) was used as conductive layer 34. A solution having the following composition was applied to this conductive layer 34 and dried forming a liquid crystal polymer layer 33, which is composed of liquid crystal 31 and polymer matrix 32, so that the dry film thickness was 6 μm.

S-LEC BX-L (a product of SEKISUI CHEMICAL CO., LTD.:

polyvinyl butyral) 10% MEK/toluene mixture solution 4.0 g

E44 (a product of MERCK CORPORATION: nematic liquid crystal) 0.4 g

An aqueous solution of Joncryl J-352 (a product of Johnson Polymer Corporation: acrylic emulsion) was applied as a surface protecting layer 30 onto the above liquid crystal dispersed polymer layer 33 and dried so that the dry film thickness was 4 μm. Thus, liquid crystal sheet 2 was prepared.

For the above liquid crystal dispersed polymer layer 33 and surface protecting layer 30 which were humidity controlled at 90% RH at a temperature of 20° C., the volume resistivity was measured using Digital Ultra-High Resistance/Micro Current Meter (a product of ADVANTEST CORPORATION: R8340A) and Sample Box for Ultra High Resistance Measurement (a product of ADVANTEST CORPORATION: TR42). The results were as follows:

| Liquid crystal dispersed polymer layer | $2.0 \times 10^{14}$ Ω·cm |
| Surface protecting layer | $6.2 \times 10^{14}$ Ω·cm |

When, a d.c. voltage of 200 V was applied to the liquid crystal sheet 2 thus prepared, using dedicated pen 5, liquid crystal 31 corresponding to the portion of handwriting 23 in liquid crystal dispersed polymer layer 33 was aligned by the electric field, so that handwriting 23 could be recognized. Then, handwriting 23 disappeared by itself after 10 second had elapsed after writing because the static charge applied to the portion of handwriting 23 moved at the top and bottom of liquid crystal dispersed polymer layer 33 and surface protecting layer 30 and was neutralized or nullified with the passage of time.

Example 2

A liquid crystal sheet 2 was prepared in a similar manner to example 1 except in that a solution having the following composition was applied and dried forming a liquid crystal polymer layer 33 so that the dry film thickness was 7 μm.

S-LEC KS-1 (a product of SEKISUI CHEMICAL CO., LTD.: polyvinyl acetal) 10% ethyl acetate solution 4.0 g E44 (a product of MERCK CORPORATION: nematic liquid crystal) 0.4 g The volume resistivity of the thus obtained liquid crystal dispersed polymer layer 33 was measured in a similar manner to example 1.

Liquid crystal dispersed polymer layer $1.2 \times 10^{15}$ Ω.cm

When, a d.c. voltage of 200 V was applied to the liquid crystal sheet 2 thus prepared, using dedicated pen 5, liquid crystal 31 corresponding to the portion of handwriting 23 in liquid crystal dispersed polymer layer 33 was aligned by the electric field, so that handwriting 23 could be recognized. Then, handwriting 23 disappeared by itself after about 1 to 2 minutes had elapsed after writing because the static charge applied to the portion of handwriting 23 moved at the top and bottom of liquid crystal dispersed polymer layer 33 and surface protecting layer 30 and was neutralized or nullified with the passage of time.

Comparative example 1

A solution mixture having the following composition was prepared by an ultrasonic dispersing device, to produce an emulsified dispersed solution in which liquid crystal 31 was micro-dispersed in a polyvinyl alcohol aqueous solution. This emulsified dispersed solution was applied and dried so that the dry film thickness was 9 μm. Except for these conditions, liquid crystal sheet 2 was prepared in a similar manner to example 1.

GOHSENOL GH-17 (a product of The Nippon Synthetic Chemical Industry Co., Ltd.: polyvinyl alcohol) 10% aqueous solution 4.0 g E44 (a product of MERCK CORPORATION: nematic liquid crystal) 0.4 g The volume resistivity of the thus obtained liquid crystal dispersed polymer layer 33 was measured in a similar manner to example 1.

Liquid crystal dispersed polymer layer $1.0 \times 10^{12}$ Ω.cm

When, a d.c. voltage of 200 V was applied to the liquid crystal sheet 2 thus prepared, using dedicated pen 5, the static charge applied to the handwriting portion moved and was neutralized quickly, without being suspended at the top and bottom of liquid crystal dispersed polymer layer 33, since the volume resistivity of liquid crystal polymer layer 33 was too low. Thus, it was impossible to recognize the handwriting.

Comparative example 2

A liquid crystal sheet 2 was prepared in a similar manner to example 1 except in that a solution having the following composition was applied and dried forming a liquid crystal polymer layer 33 so that the dry film thickness was 7 μm.

S-LEC KS-1 (a product of SEKISUI CHEMICAL CO., LTD.: polyvinyl acetal) 10% ethyl acetate solution 4.2 g TAKENATE D110N(a product of Takeda Chemical Industries, Ltd.: polyisocyanate) 0.56 g E44 (a product of MERCK CORPORATION: nematic liquid crystal) 0.36 g The volume resistivity of the thus obtained liquid crystal dispersed polymer layer 33 was measured in a similar manner to example 1.

Liquid crystal dispersed polymer layer $1.2 \times 10^{17}$ Ω.cm

When, a d.c. voltage of 200 V was applied to the liquid crystal sheet 2 thus prepared, using dedicated pen 5, liquid crystal 31 corresponding to the portion of handwriting 23 in liquid crystal dispersed polymer layer 33 was aligned by the electric field, so that handwriting 23 could be recognized. However, since the volume resistivity of liquid crystal dispersed polymer layer 33 was too high, the static charge applied to the portion of handwriting 23 did not move at the top and bottom of liquid crystal dispersed polymer layer 33 and hence was not neutralized after a certain period of time. Therefore, handwriting 23 did not disappear completely even after more than 10 minutes had elapsed after writing.

Comparative example 3

A liquid crystal sheet 2 was prepared in a similar manner to example 1 except in that CROSLENE SA-54 (a product of Takeda Chemical Industries,Ltd.: styrene-butadiene rubber emulsion) was applied and dried on conductive layer 34 and liquid crystal dispersed polymer layer 33 of the same type as in example 1, forming a surface protecting layer 30, so that the dry film thickness was 6 μm.

The volume resistivity of surface protecting layer 30 was measured in a similar manner to example 1.

Surface surface protecting layer $4.0 \times 10^8$ Ω.cm

When, a d.c. voltage of 200 V was applied to the liquid crystal sheet 2 thus prepared, using dedicated pen 5, the handwriting spread as if it were blotting and could not be recognized because the volume resistivity of surface protecting layer 30 was too low and hence the static charge applied to the handwriting portion spread quickly over the surface of the surface protecting layer.

Comparative example 4

A liquid crystal sheet 2 was prepared in a similar manner to example 1 except in that Tetoron film F (a product of TEIJIN CO., LTD.: polyethylene terephthalate film) of 9 μm thick, was laminated as a surface protecting layer 30, on conductive layer 34 and liquid crystal dispersed polymer layer 33 of the same type as in example 1, using a sticky material.

The volume resistivity of surface protecting layer 30 was measured in a similar manner to example 1.

Surface protecting layer $3.1 \times 10^{17}$ Ω.cm

When, a d.c. voltage of 200 V was applied to the liquid crystal sheet 2 thus prepared, using dedicated pen 5, liquid crystal 31 corresponding to the portion of handwriting 23 in liquid crystal dispersed polymer layer 33 was aligned by the electric field, so that handwriting 23 could be recognized. Though handwriting 23 disappeared by itself after 10 second had elapsed after writing, the static charge was suspended on the top and bottom of surface protecting layer 30 because the volume resistivity of surface protecting layer 30 was too high, and hence handwriting could not be obtained when another writing step was performed over the handwriting which had disappeared.

INDUSTRIAL APPLICABILITY

As has been described in detail, in accordance with the signature input apparatus and signature verification system of the invention, when a signature is written on the liquid crystal sheet attached on the surface of the coordinate input unit, by a coordinate pointer having the function of applying static charge, smooth handwriting appears as its liquid crystal representation, on the liquid crystal sheet screen. Therefore, a signature can be written easily, and the precision of the signature can be improved, so that it is possible to improve the accuracy of signature registration and signature verification.

Further, since the handwriting of a signature written on the liquid crystal sheet disappears by itself without holding up the signer after a predetermined period of time, there is no concern that the handwriting will be viewed by others, thus improving the security. Moreover, since the liquid crystal sheet has a simple structure, the cost can also be lowered also it is possible to easily attach the liquid crystal sheet on, and detach it from, the surface of a coordinate input unit on the market.

What is claimed is:

1. A signature input apparatus comprising:
    a liquid crystal sheet having a conductive layer and a liquid crystal dispersed polymer layer in which a liquid crystal is dispersed in a polymer matrix;
    a coordinate pointer for applying static charge onto the liquid crystal sheet causing the handwriting of a signature to appear as a liquid crystal representation; and
    a coordinate input unit for detecting handwriting coordinate information of the signature written on the liquid crystal sheet,
    wherein the static charge applied to the polymer matrix neutralizes by itself over a period of time, causing the handwriting of the signature written on the liquid crystal sheet to disappear solely by itself within a period of time of two minutes or less and commensurate with prevention of unauthorized observation and/or coping of the written signature.

2. The signature input apparatus according to claim 1, wherein the liquid crystal sheet further includes a transparent, surface protecting layer, the conductive layer, the liquid crystal dispersed polymer layer and the surface protecting layer being laminated successively in that order.

3. The signature input apparatus according to claim 1 or claim 2, wherein the liquid crystal sheet is removably attached to the surface of the coordinate input unit.

4. The signature input apparatus according to claim 1 or claim 2, wherein the polymer matrix comprises a cross-linking polymer obtained by reacting di- or poly-isocyanate with polyvinyl acetal resin.

5. The signature input apparatus according to claim 1 or claim 2, wherein the liquid crystal is a nematic liquid crystal having a positive anisotropic dielectric constant, and the differential index of birefringence is 0.2 or more.

6. The signature input apparatus according to claim 1, wherein the volume resistivity of the liquid crystal dispersed polymer layer is equal to or greater than $10^{13}$ Ω.cm and lower than $10^{16}$ Ω.cm at a temperature of 20° C. at a relative humidity of 90%.

7. The signature input apparatus according to claim 2, wherein the volume resistivity of the liquid crystal dispersed polymer layer is equal to or greater than $10^{13}$ Ω.cm and lower than $10^{16}$ Ω.cm at a temperature of 20° C. at a relative humidity of 90%, and the volume resistivity of the surface protecting layer is equal to or greater than $10^9$ Ω.cm and lower than $10^{16}$ Ω.cm at a temperature of 20° C. at a relative humidity of 90%.

8. A signature verification system comprising:
    (A) a signature input apparatus comprising: a liquid crystal sheet having a conductive layer and a liquid crystal dispersed polymer layer in which a liquid crystal is dispersed in a polymer matrix, a coordinate pointer for applying static charge onto the liquid crystal sheet causing the handwriting of a signature to appear as a liquid crystal representation, and a coordinate input unit for detecting the handwriting coordinate information of the signature, wherein the static charge applied to the polymer matrix neutralizes by itself over a period of time, causing the handwriting of the signature written on the liquid crystal sheet to disappear solely by itself within a period of time of two minutes or less and commensurate with prevention of unauthorized observation and/or copying of the written signature; and (B) a signature verifying apparatus for reading the handwriting coordinate information of a signature output from the coordinate input unit and verifies the handwriting coordinate information with the handwriting coordinate information of signatures registered beforehand.

9. The signature verification system according to claim 8, wherein the liquid crystal sheet further includes a transparent, surface protecting layer, the conductive layer, the liquid crystal dispersed polymer layer and the surface protecting layer being laminated successively in that order.

10. The signature verification system according to claim 8 or claim 9, wherein the liquid crystal sheet is removably attached to the surface of the coordinate input unit.

11. The signature verification system according to claim 8 or claim 9, wherein the polymer matrix is composed of a cross-linking polymer obtained by reacting di- or polyisocyanate with polyvinyl acetal resin.

12. The signature verification system according to claim 8 or claim 9, wherein the liquid crystal is a nematic liquid crystal having a positive anisotropic dielectric constant, and the differential index of birefringence is 0.2 or more.

13. The signature verification system according to claim 8, wherein the volume resistivity of the liquid crystal dispersed polymer layer is equal to or greater than $10^{13}$ $\Omega.cm$ and lower than $10^{16}$ $\Omega.cm$ at a temperature of 20° C. at a relative humidity of 90%.

14. The signature verification system according to claim 9, wherein the volume resistivity of the liquid crystal dispersed polymer layer is equal to or greater than $10^{13}$ $\Omega.cm$ and lower than $10^{16}$ $\Omega.cm$ at a temperature of 20° C. at a relative humidity of 90%, and the volume resistivity of the surface protecting layer is equal to or greater than $10^{9}$ $\Omega.cm$ and lower than $10^{16}$ $\Omega.cm$ at a temperature of 20° C. at a relative humidity of 90%.

15. The signature input apparatus according to either of claims 1 or 8, wherein the signature written on the liquid crystal sheet disappears by charge movement within the liquid crystal sheet.

* * * * *